(12) United States Patent  
Kawaguchi et al.

(10) Patent No.: US 8,741,045 B2
(45) Date of Patent: Jun. 3, 2014

(54) INK COMPOSITION, INKJET RECORDING METHOD, AND COLORED MATERIAL

(75) Inventors: Akira Kawaguchi, Tokyo (JP); Takahiko Matsui, Tokyo (JP); Takashi Yoshimoto, Tokyo (JP); Kenji Ooshima, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/806,956

(22) PCT Filed: Jun. 24, 2011

(86) PCT No.: PCT/JP2011/064543
§ 371 (c)(1), (2), (4) Date: Dec. 26, 2012

(87) PCT Pub. No.: WO2012/002277
PCT Pub. Date: Jan. 5, 2012

(65) Prior Publication Data
US 2013/0288019 A1 Oct. 31, 2013

(30) Foreign Application Priority Data

Jul. 1, 2010 (JP) ................................ 2010-150806

(51) Int. Cl.
*C09D 11/02* (2014.01)

(52) U.S. Cl.
USPC ..................................... 106/31.48; 106/31.5

(58) Field of Classification Search
CPC ..... C09D 11/328; C09B 67/0046; B41J 2/01; B41M 5/5218
USPC ............... 106/31.48, 31.5; 347/20; 428/195.1
See application file for complete search history.

(56) References Cited

U.S. PATENT DOCUMENTS 7,465,346 B2 * 12/2008 Fukumoto et al. ......... 106/31.48
7,503,965 B2    3/2009 Matsui et al.
(Continued)

FOREIGN PATENT DOCUMENTS

CN    101528858 A     9/2009
EP    1 734 081 A1   12/2006
(Continued)

OTHER PUBLICATIONS

Extended European Search Report mailed Nov. 15, 2013 in European Application No. 11800742.6.

(Continued)

*Primary Examiner* — Helene Klemanski
(74) *Attorney, Agent, or Firm* — Knobbe Martens Olson & Bear LLP

(57) ABSTRACT

An aqueous black ink composition which enables the formation of an excellent black recorded image having extremely high ozone gas resistance and a neutral and achromatic color. The ink composition comprises: a dye which includes at least one compound represented by specific formula (1) or at least one tautomer or salt of the compound; a dye which includes at least one compound represented by specific formula (3) or at least one tautomer or salt of the compound; and a dye which includes at least one compound represented by specific formula (4) or at least one tautomer or salt of the compound.

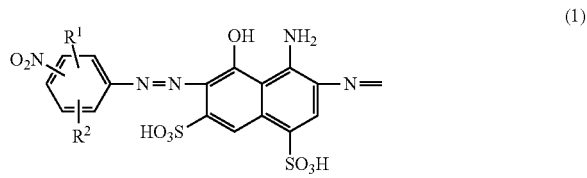

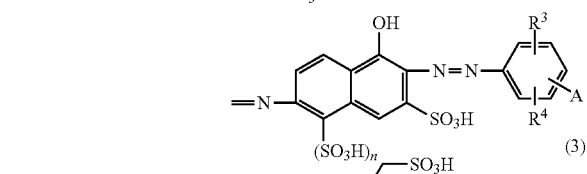

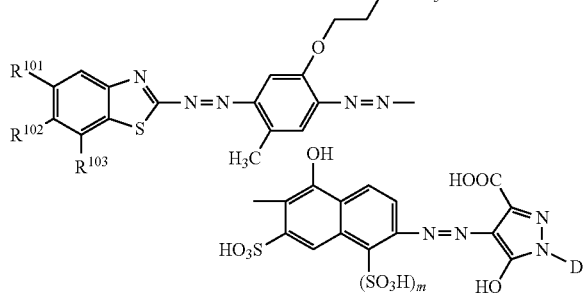

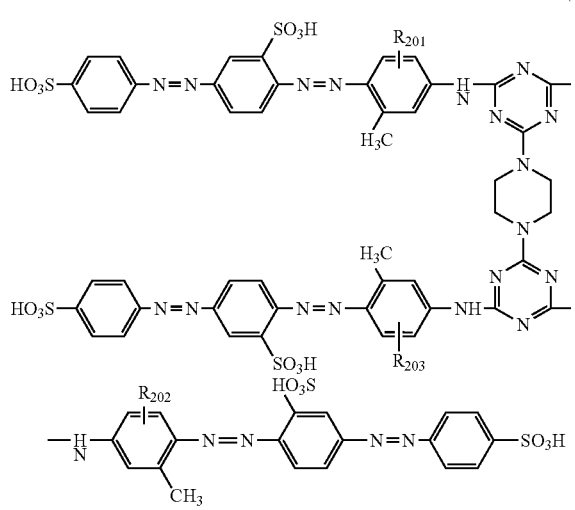

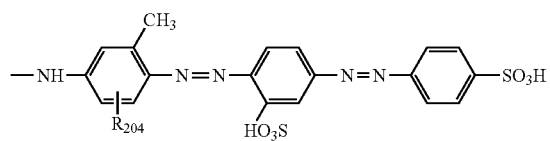

11 Claims, No Drawings

(56) References Cited

U.S. PATENT DOCUMENTS

| | | |
|---|---|---|
| 7,503,967 B2 * | 3/2009 | Matsui et al. ............ 106/31.52 |
| 7,704,311 B2 * | 4/2010 | Tojo ........................ 106/31.48 |
| 7,771,525 B2 | 8/2010 | Morita et al. |
| 8,167,991 B2 * | 5/2012 | Matsui et al. ............. 106/31.5 |
| 8,496,746 B2 * | 7/2013 | Teramoto et al. .......... 106/31.48 |
| 8,512,462 B2 * | 8/2013 | Matsui et al. ............. 106/31.48 |
| 2008/0292792 A1 | 11/2008 | Matsui et al. |
| 2013/0002757 A1 * | 1/2013 | Aruga et al. ................. 347/33 |
| 2013/0101811 A1 * | 4/2013 | Kawaguchi et al. ....... 428/195.1 |

FOREIGN PATENT DOCUMENTS

| | | |
|---|---|---|
| JP | 2008-024909 | 2/2008 |
| JP | 2009-040861 A | 2/2009 |
| JP | 2009-512737 A | 3/2009 |
| JP | 2009-084346 A | 4/2009 |
| JP | 2009-185133 | 8/2009 |
| WO | WO 2005/097912 A1 | 10/2005 |
| WO | WO 2007/046553 | 4/2007 |
| WO | WO 2007/077931 A1 | 7/2007 |
| WO | WO 2009/069279 A1 | 6/2009 |
| WO | WO 2011/043184 A1 | 4/2011 |

OTHER PUBLICATIONS

Notice of Reasons for Rejection issued on Dec. 6, 2013 in Chinese Patent Application No. 201180032527.7.

* cited by examiner

INK COMPOSITION, INKJET RECORDING METHOD, AND COLORED MATERIAL

This application is the U.S. National Phase under 35 U.S.C. §371 of International Application PCT/JP2011/064543, filed Jun. 24, 2011, designating the U.S., and published in Japanese as WO 2012/002277 on Jan. 5, 2012, which claims priority to Japanese Patent Application No. 2010-150806, filed Jul. 1, 2010, the entire contents of which are incorporated herein by reference.

TECHNICAL FIELD

The present invention relates to an ink composition containing specific three kinds of coloring matters, an ink jet recording method using the ink composition, and a colored body colored by the ink composition.

BACKGROUND ART

One of the representative methods for various color recording methods may be a recording method using an ink jet printer, that is, an ink jet recording method. This recording method involves producing small droplets of ink, and attaching these small droplets to various record-receiving materials (paper, film, clothes and the like) to perform recording. In this method, the method is characterized in that since the recording head and the record-receiving material are not brought into direct contact, the process is quiet with less noise generation, and size reduction or an increased speed can easily be achieved. Therefore, the method has rapidly become popular in recent years, and an extensive growth in use of the method is expected.

Conventionally, aqueous inks prepared by dissolving a water-soluble coloring matter in an aqueous medium have been used as the inks for fountain pens, felt pens and the like and as the inks for ink jet recording. In these aqueous inks, water-soluble organic solvents are generally added so as to prevent clogging of the inks at the pen tips or ink discharge nozzles. Furthermore, these inks are required to have advantages such as the production of recorded images of sufficient densities (high print density), no occurrence of clogging at the pent tips or nozzles, satisfactory drying properties on record-receiving materials, less bleeding, and excellent storage stability. Further, the water-soluble coloring matters used therein is required to have high solubility particularly in water, and high solubility in the water-soluble organic solvents that are added to the ink. In addition, the images thus formed are required to have image fastness properties such as water resistance, light fastness, gas fastness and moisture resistance.

Among these, the above-described term gas fastness is a resistance to the phenomenon that oxidizing gas such as ozone gas present in air acts on the coloring matter within a recording paper and changes the color of a printed image. In addition to ozone gas, examples of oxidizing gases having this kind of action include NOx and SOx. However, among these oxidizing gases, ozone gas is considered as a main causative substance which accelerates the phenomenon of discoloration and fading of ink jet recorded images. For this reason, among the gas fastness, particularly ozone gas fastness tends to be regarded as most important. In an ink-receiving layer provided on the surface of exclusive ink jet paper of photographic image quality, materials such as porous white inorganic substances are frequently used for the purpose of speeding up drying of the ink, and reducing the bleeding at high image quality. In the images recorded in such a recording paper, significant discoloration and fading of the recorded image due to ozone gas is observed. Since the phenomenon of discoloration and fading due to an oxidizing gas, is characteristic to ink jet images, an enhancement of ozone gas fastness has been one of the most important problems to be solved in the ink jet recording method.

In order to expand the field of use in those recording (printing) methods using ink in the future, it is strongly desired to further enhance light fastness, ozone gas fastness, moisture resistance and water resistance in the ink composition used in ink jet recording and the colored body colored by the ink composition.

Inks of various colors have been prepared from various coloring matters; however, among them, a black ink is an important ink that is used in both of mono-color and full-color images. However, it has many difficult points technically to develop a coloring matter having a neutral hue between the dark color gamut and the light color gamut, and having high print density, and further having less dependency of the hue on the light source and exhibiting good black. Thus, although many researches and developments have been performed, those having sufficient performances are still few. For the reason, it is generally performed to prepare a black ink by combining multiple, versatile coloring matters. However, the preparation of an ink by mixing multiple coloring matters has problems such as 1) variation of the hues depending on the medium (record-receiving materials) and 2) particularly, increase of discoloration by decomposition of the coloring matters by light or ozone gas, in comparison to adjustment of an ink with a single coloring matter.

A black ink composition for ink jet to render a printed matter to have good various durabilities is proposed in, for example, Patent Documents 1, 2 and 3, and the like. This ink composition is a greatly improved ink composition having good image fastness properties of a printed matter. However, use of these ink compositions as an ink in a single color has not been applied to a neutral black printed matter, and have not sufficiently satisfied further demands of the market requiring high image fastness properties. In addition, Patent Documents 4 and 5 disclose a technique of combining various inks to obtain a black ink composition. However, there is no disclosed ink composition satisfying high fastness properties and color development properties, whereby to satisfy demands of the market.

Patent Document 1: Japanese Unexamined Patent Application, Publication No. 2009-84346
Patent Document 2: PCT International Application, Publication No. 2009/069279
Patent Document 3: PCT International Application, Publication No. 2005/097912
Patent Document 4: PCT International Application, Publication No. 2007/077931
Patent Document 5: Japanese Unexamined Patent Application (Translation of PCT Application), Publication No. 2009-512737

DISCLOSURE OF THE INVENTION

Problems to be Solved by the Invention

An object of the present invention is to provide an aqueous black ink composition which has very high ozone gas fastness of recorded images, and produces excellent black recorded images in neutral achromatic color.

Means for Solving the Problems

The inventors of the present invention repeatedly conducted thorough investigations so as to solve such problems described above, and as a result, the inventors found that an ink composition containing a compound represented by a specific formula (1) or a tautomer thereof or a salt thereof as a coloring matter (I); a compound represented by a specific formula (3) or a tautomer thereof or a salt thereof as a coloring matter (II); and a compound represented by a specific formula (4) or a salt thereof as a coloring matter (III) in at least one kind, respectively, can solve the problems described above, thus completing the present invention.

Accordingly, a first aspect of the present invention provides an ink composition containing at least one kind of a compound represented by the following formula (1) or a tautomer thereof or a salt thereof as a coloring matter (I):

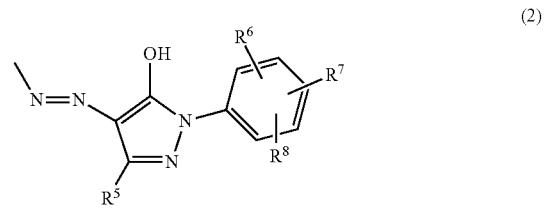

(2)

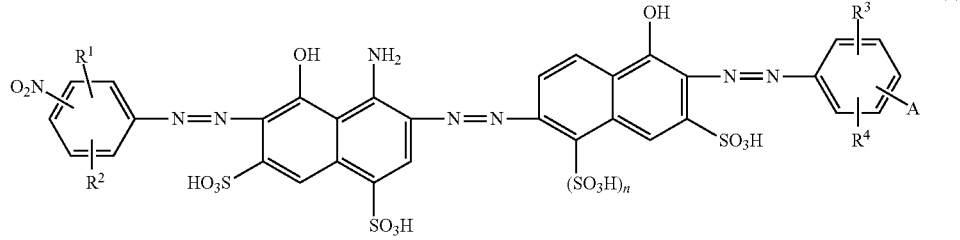

(1)

in the formula (1), $R^1$ and $R^2$ each independently represent a hydrogen atom; a halogen atom; a cyano group; a carboxy group; a sulfo group; a sulfamoyl group; an N-alkylaminosulfonyl group; an N,N-dialkylaminosulfonyl group; an N-phenylaminosulfonyl group; a phospho group; a nitro group; an acyl group; a ureido group; a C1-C4 alkyl group; a C1-C4 alkyl group substituted with a hydroxy group or a C1-C4 alkoxy group; a C1-C4 alkoxy group; a C1-C4 alkoxy group substituted with at least one kind of a group selected from the group consisting of a hydroxy group, a C1-C4 alkoxy group, a sulfo group, and a carboxy group; or an acylamino group;

$R^3$ and $R^4$ each independently represent a hydrogen atom; a halogen atom; a cyano group; a carboxy group; a sulfo group; a nitro group; a C1-C4 alkyl group; a C1-C4 alkoxy group; or a C1-C4 alkoxy group substituted with at least one kind of a group selected from the group consisting of a hydroxy group, a C1-C4 alkoxy group, a sulfo group, and a carboxy group;

n is 0 or 1, and the group A is a group represented by the following formula (2):

in the formula (2), $R^5$ represents a cyano group; a carboxy group; a C1-C4 alkyl group; a C1-C4 alkoxycarbonyl group; or a phenyl group;

$R^6$, $R^7$ and $R^8$ each independently represent a hydrogen atom; a halogen atom; a cyano group; a carboxy group; a sulfo group; a nitro group; a C1-C4 alkyl group; a C1-C4 alkoxy group; a C1-C4 alkoxy group substituted with at least one kind of a group selected from the group consisting of a hydroxy group, a C1-C4 alkoxy group, and a sulfo group; or an acylamino group, at least one kind of a compound represented by the following formula (3) or a tautomer thereof or a salt thereof as a coloring matter (II):

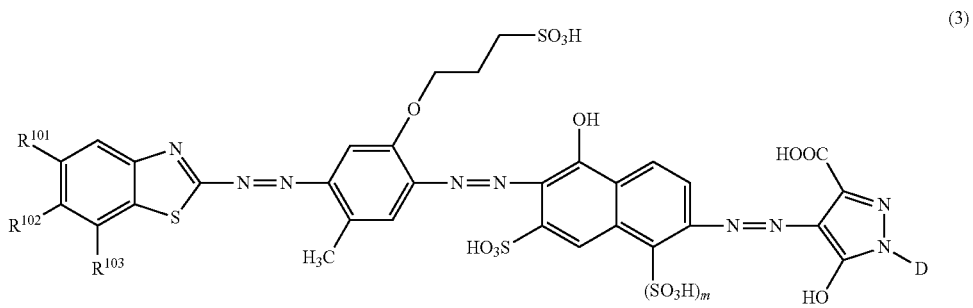

(3)

in the formula (3), m is 0 or 1, $R^{101}$ to $R^{103}$ each independently represent a hydrogen atom;

a sulfo group; or a C1-C4 alkoxy group; and the group D represents a phenyl group or a naphthyl group substituted with one to three sulfo groups, and at least one kind of a compound represented by the following formula (4) or a salt thereof as a coloring matter (III):

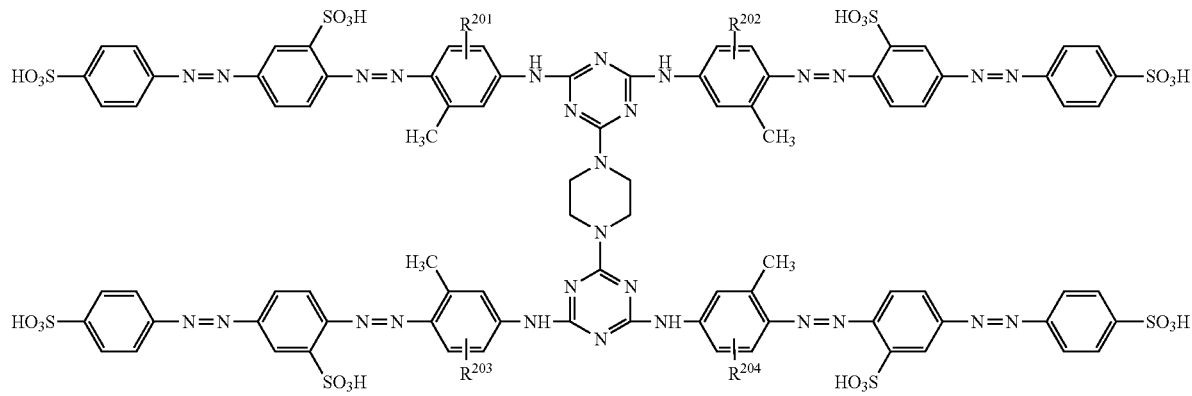

(4)

in the formula (4), $R^{201}$ to $R^{204}$ each independently represent a hydrogen atom; or a C1-C4 alkoxy group substituted with a sulfo group.

A second aspect of the invention provides the ink composition according to the first aspect, wherein in the formula (1), the substitution position of the nitro group is the 4-position when the substitution position of the azo group on the benzene ring to which the nitro group is substituted, is designated as the 1-position, the substitution position of the group A is the 4-position when the substitution position of the azo group on the benzene ring to which the group A is substituted, is designated as the 1-position, n is 1, $R^1$, $R^3$ and $R^7$ are a sulfo group, $R^2$ is a hydrogen atom, $R^4$ is a hydrogen atom, a chlorine atom, or a sulfo group, and $R^5$ is a carboxy group.

A third aspect of the invention provides the ink composition according to the first or second aspect, wherein in the formula (3), m is 1, $R^{101}$ is a hydrogen atom or a sulfo group, $R^{102}$ is a C1-C4 alkoxy group, $R^{103}$ is a hydrogen atom or a sulfo group, and the group D is any one of a phenyl group substituted with one or two sulfo groups, and a naphthyl group substituted with three sulfo groups.

A fourth aspect of the invention provides the ink composition according to any one of the first to third aspects, wherein in the formula (4), at least one of $R^{201}$ and $R^{202}$ is a sulfopropoxy group, and at least one of $R^{203}$ and $R^{204}$ is a sulfopropoxy group.

A fifth aspect of the invention provides the ink composition according to any one of the first to fourth aspects, wherein the ratio of the coloring matter (I) is 10 to 80% by mass, the ratio of the coloring matter (II) is 10 to 80% by mass, and the ratio of the coloring matter (III) is 10 to 40% by mass in the total mass of the coloring matter contained in the ink composition.

A sixth aspect of the invention provides an ink jet recording method, including performing recording by using the ink composition according to any one of the first to fifth aspects as an ink, discharging ink droplets of the ink in accordance with a recording signal, and thereby attaching the ink droplets onto a record-receiving material.

An seventh aspect of the invention provides the ink jet recording method according to the sixth aspect, wherein the record-receiving material is a communication sheet.

An eighth aspect of the invention provides the ink jet recording method according to the seventh aspect, wherein the communication sheet is a sheet having an ink-receiving layer containing a porous white inorganic substance.

A ninth aspect of the invention provides a colored body colored by means of the ink composition according to any one of the first to fifth aspects, or the ink jet recording method according to any one of the sixth to eighth aspects.

A tenth aspect of the invention provides an ink jet printer loaded with a container containing the ink composition according to any one of the first to fifth aspects.

Effects of the Invention

According to the present invention, an aqueous black ink composition being very excellent in various fastness properties, particularly ozone gas fastness required for ink jet recorded images, and having sufficiently high print density, and producing neutral high quality black recorded images with low chroma and no color tone is obtained.

PREFERRED MODE FOR CARRYING OUT THE INVENTION

Hereinafter, the present invention will be described in detail.

Meanwhile, in order to avoid complication in the present specification described below, any of "a compound", "a tautomer thereof" and "a salt thereof" is simply described as a "compound". Unless particularly stated otherwise in the present specification, acid functional groups such as a sulfo group and a carboxy group are presented in the form of free acid.

The ink composition of the present invention is an ink composition containing a coloring matter (I), a coloring matter (II), and a coloring matter (III) represented by specific formulae.

The coloring matter (I) contained in the ink composition of the present invention will be described.

The coloring matter (I) contained in the ink composition of the present invention is a compound represented by the formula (1). The coloring matter (I) is composed of at least one kind of a compound represented by the formula (1), and may be a coloring matter composed of a single compound represented by the formula (1), or may be a mixture of coloring matters composed of multiple compounds. Meanwhile, the compound represented by the formula (1) is a water-soluble dye.

In the formula (1), examples of the halogen atom for $R^1$ and $R^2$ include a fluorine atom, a chlorine atom, a bromine atom and an iodine atom, preferably a fluorine atom, a chlorine atom and a bromine atom, and more preferably a chlorine atom.

In the formula (1), the N-alkylaminosulfonyl group for $R^1$ and $R^2$ may be a linear or branched alkylaminosulfonyl group, and a linear alkylaminosulfonyl group is preferred. Specific examples include N—C1-C4 alkylaminosulfonyl groups such as an N-methylaminosulfonyl group, an N-ethylaminosulfonyl group and an N-(n-butyl)aminosulfonyl group.

Furthermore, examples of the N,N-dialkylaminosulfonyl group include N,N-di-C1-C4 alkylaminosulfonyl groups such as an N,N-dimethylaminosulfonyl group and an N,N-di (n-propyl)aminosulfonyl group; and the like.

In the formula (1), the acyl group for $R^1$ and $R^2$ may be an alkylcarbonyl group or an arylcarbonyl group.

Examples of the alkylcarbonyl group include usually a C1-C6 alkylcarbonyl group, preferably a C1-C4 alkylcarbonyl group in which the alkyl moiety is a linear one or a branched one, and preferably a linear alkylcarbonyl group. Specific examples include linear alkylcarbonyl groups such as acetyl (methylcarbonyl), propionyl (ethylcarbonyl) and butyryl (propylcarbonyl); branched alkylcarbonyl groups such as isobutyryl (isopropylcarbonyl); and the like.

The arylcarbonyl group may be those having C6-C10 of the carbon number in the aryl moiety, and specific examples include benzoyl, naphthoyl and the like.

In the formula (1), the C1-C4 alkyl group for $R^1$ and $R^2$ may be a linear or branched alkyl group, and a linear alkyl group is preferred. Specific examples include linear alkyl groups such as methyl, ethyl, n-propyl and n-butyl; and branched alkyl groups such as isopropyl, isobutyl, sec-butyl, and t-butyl. Among these, methyl is particularly preferred.

In the formula (1), the C1-C4 alkyl group substituted with a hydroxy group or a C1-C4 alkoxy group for $R^1$ and $R^2$ may be a C1-C4 alkyl group for $R^1$ and $R^2$ having a substituent of a hydroxy group or a C1-C4 alkoxy group on any arbitrary carbon atom thereof. The alkyl moiety may be a linear or branched alkyl group, and a linear alkyl group is preferred. Specific examples include hydroxy-C1-C4 alkyl groups such as 2-hydroxyethyl, 2-hydroxypropyl and 3-hydroxypropyl; C1-C4 alkoxy-C1-C4 alkyl groups such as methoxyethyl, 2-ethoxyethyl, n-propoxyethyl, isopropoxyethyl, n-butoxyethyl, methoxypropyl, ethoxypropyl, n-propoxypropyl, isopropoxybutyl and n-propoxybutyl; and the like.

In the formula (1), the C1-C4 alkoxy group for $R^1$ and $R^2$ may be a linear or branched alkoxy group, and a linear alkoxy group is preferred. Specific examples include linear alkoxy groups such as methoxy, ethoxy, n-propoxy, and n-butoxy; and branched alkoxy groups such as isopropoxy, isobutoxy, sec-butoxy, and t-butoxy. Among these, methoxy is particularly preferred.

In the formula (1), the C1-C4 alkoxy group substituted with at least one kind of a group selected from the group consisting of a hydroxy group, a C1-C4 alkoxy group, a sulfo group, and a carboxy group for $R^1$ and $R^2$, may be a C1-C4 alkoxy group for $R^1$ and $R^2$ having these substituents on any arbitrary carbon atoms thereof. There are no particular limitations on the position of the substituent, but it is preferable that two or more oxygen atoms do not substitute the same carbon atom. Specific examples include those substituted with a hydroxy group such as 2-hydroxyethoxy, 2-hydroxypropoxy and 3-hydroxypropoxy; those substituted with a C1-C4 alkoxy group such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; those substituted with a sulfo group such as 2-sulfoethoxy, 3-sulfopropoxy and 4-sulfobutoxy; those substituted with a carboxy group such as carboxymethoxy, 2-carboxy ethoxy and 3-carboxypropoxy; and the like.

Among these, a C1-C4 alkoxy group substituted with a sulfo group is preferred.

In the formula (1), the acylamino group for $R^1$ and $R^2$ may be an alkylcarbonylamino group and an arylcarbonylamino group.

Examples of the alkylcarbonylamino group include usually a C1-C6 alkylcarbonylamino group, preferably a C1-C4 alkylcarbonylamino group, in which the alkyl moiety is a linear one or a branched one, and preferably a linear alkylcarbonylamino group. Specific examples include those having the alkyl moiety that is a linear group such as acetylamino (methylcarbonylamino), propionyl amino (ethylcarbonylamino), and butyryl amino (propylcarbonylamino); those having the alkyl moiety that is a branched group such as isobutyryl amino (isopropylcarbonylamino); and the like.

The arylcarbonylamino group may be those having C6-C10 of the carbon number in the aryl moiety. Specific examples include benzoylamino, naphthoylamino and the like.

$R^1$ and $R^2$ in the formula (1) are preferably a hydrogen atom, a carboxy group, a sulfo group, a C1-C4 alkoxy group, or a C1-C4 alkoxy group substituted with a sulfo group. More preferably, one of $R^1$ and $R^2$ is a hydrogen atom, and the other of $R^1$ and $R^2$ is a group other than a hydrogen atoms; or one of $R^1$ and $R^2$ is a sulfo group, and the other of $R^1$ and $R^2$ is a C1-C4 alkoxy group substituted with a sulfo group; but, the former is further preferred.

There are no particular limitations on the substitution positions of the nitro group, $R^1$ and $R^2$ which are substituted on the same benzene ring in the formula (1).

The substitution positions are preferably the following combinations (a) to (d), and particularly preferably the combination (a) when the substitution position of the azo group substituted on the benzene ring is designated as the 1-position.

(a) The nitro group at the 4-position, $R^1$ at the 2-position, and $R^2$ at the 6-position.
(b) The nitro group at the 4-position, $R^1$ at the 2-position, and $R^2$ at the 5-position.
(c) The nitro group at the 2-position, $R^1$ at the 4-position and $R^2$ at the 6-position.
(d) The nitro group at the 3-position, $R^1$ at the 2-position, and $R^2$ at the 5-position.

In the formula (1), the halogen atom for $R^3$ and $R^4$ may be those described for the "halogen atom for $R^1$ and $R^2$" described above, including preferred ones and the like.

In the formula (1), the C1-C4 alkyl group for $R^3$ and $R^4$ may be those described for the "C1-C4 alkyl group for $R^1$ and $R^2$" described above, including preferred ones and the like.

In the formula (1), the C1-C4 alkoxy group for $R^3$ and $R^4$ may be those described for the "C1-C4 alkoxy group for $R^1$ and $R^2$" described above, including preferred ones and the like.

In the formula (1), the C1-C4 alkoxy group substituted with at least one kind of a group selected from the group consisting of a hydroxy group, a C1-C4 alkoxy group, a sulfo group, and a carboxy group for $R^3$ and $R^4$ may be those described for the "C1-C4 alkoxy group substituted with at least one kind of a group selected from the group consisting of a hydroxy group, a C1-C4 alkoxy group, a sulfo group, and a carboxy group for $R^1$ and $R^2$" described above, including preferred ones and the like.

$R^3$ and $R^4$ in the formula (1) are preferably a hydrogen atom, a halogen atom, a carboxy group, a sulfo group, a nitro group, a C1-C4 alkyl group or a C1-C4 alkoxy group. More preferably, one of $R^3$ and $R^4$ is a hydrogen atom, a halogen atom, a carboxy group, a sulfo group, a nitro group, a C1-C4 alkyl group, or a C1-C4 alkoxy group, and the other of $R^3$ and $R^4$ is a carboxy group or a sulfo group. Further preferably, one of $R^3$ and $R^4$ is a hydrogen atom, a halogen atom, a carboxy group, a sulfo group, a nitro group, a C1-C4 alkyl group, or a C1-C4 alkoxy group, and the other of $R^3$ and $R^4$ is a sulfo group.

Particularly preferably, one of $R^3$ and $R^4$ is a chlorine atom, and the other of $R^3$ and $R^4$ is a sulfo group.

In the formula (1), there are no particular limitations on the substitution positions of $R^3$, $R^4$, and the group A substituted on the same benzene ring.

The substitution positions are preferably the following combinations (e) to (h), and particularly preferably the combination (e) when the substitution position of the azo group substituted on the benzene ring is designated as the 1-position.
(e) One of $R^3$ and $R^4$ at the 3-position, and the other of $R^3$ and $R^4$ at the 5-position, and the group A at the 4-position.
(f) One of $R^3$ and $R^4$ at the 2-position, and the other of $R^3$ and $R^4$ at the 5-position, and the group A at the 4-position.
(g) One of $R^3$ and $R^4$ at the 2-position, and the other of $R^3$ and $R^4$ at the 4-position, and the group A at the 5-position.
(h) One of $R^3$ and $R^4$ at the 3-position, and the other of $R^3$ and $R^4$ at the 4-position, and the group A at the 5-position.

In the formula (1), the group A is a group represented by the formula (2).

In the formula (2), the C1-C4 alkyl group for $R^5$ may be those described for the "C1-C4 alkyl group for $R^1$ and $R^2$" described above, including preferred ones and the like.

In the formula (2), the C1-C4 alkoxycarbonyl group for $R^5$ may be a linear or branched alkoxycarbonyl group, and a linear alkoxycarbonyl group is preferred. Specific examples include linear alkoxycarbonyl groups such as methoxycarbonyl, ethoxycarbonyl, n-propoxycarbonyl and n-butoxycarbonyl; branched alkoxycarbonyl groups such as isopropoxycarbonyl, isobutoxycarbonyl, sec-butoxycarbonyl and t-butoxycarbonyl; and the like.

$R^5$ in the formula (2) is preferably a cyano group, a carboxy group, a C1-C4 alkyl group, or a phenyl group, more preferably a cyano group or a carboxy group, and further preferably a carboxy group.

In the formula (2), the halogen atom for $R^6$, $R^7$ and $R^8$ may be those described for the "halogen atom for $R^1$ and $R^2$" described above, including preferred ones and the like.

In the formula (2), the C1-C4 alkyl group for $R^6$, $R^7$ and $R^8$ may be those described for the "C1-C4 alkyl group for $R^1$ and $R^2$" described above, including preferred ones and the like.

In the formula (2), the C1-C4 alkoxy group for $R^6$, $R^7$ and $R^8$ may be those described for the "C1-C4 alkoxy group for $R^1$ and $R^2$" described above, including preferred ones and the like.

In the formula (2), the C1-C4 alkoxy group substituted with at least one kind of a group selected from the group consisting of a hydroxy group, a C1-C4 alkoxy group, and a sulfo group for $R^6$, $R^7$ and $R^8$, may be the C1-C4 alkoxy group having these substituents on any arbitrary carbon atom thereof for $R^6$, $R^7$ and $R^8$ described above. There are no particular limitations on the positions of the substituents, but it is preferable that two or more oxygen atoms do not substitute the same carbon atom.

Specific examples include hydroxy-C1-C4 alkoxy groups such as 2-hydroxyethoxy, 2-hydroxypropoxy and 3-hydroxypropoxy; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; sulfo-C1-C4 alkoxy groups such as 3-sulfopropoxy and 4-sulfobutoxy; and the like.

In the formula (2), the acylamino group for $R^6$, $R^7$ and $R^8$ may be those described for the "acylamino group for $R^1$ and $R^2$" described above, including preferred ones and the like.

In the formula (2), $R^6$, $R^7$ and $R^8$ are preferably a hydrogen atom, a halogen atom, a carboxy group, a sulfo group, a C1-C4 alkyl group, or a C1-C4 alkoxy group. More preferably, any one of $R^6$, $R^7$ and $R^8$ is a hydrogen atom, and the others of $R^6$, $R^7$ and $R^8$ are any two selected from a halogen atom, a carboxy group, and a sulfo group; or any two of $R^6$, $R^7$ and $R^8$ are a hydrogen atom, and the other of $R^6$, $R^7$ and $R^8$ is a sulfo group; and particularly preferably, any two of $R^6$, $R^7$ and $R^8$ is a hydrogen atom, and the other of $R^6$, $R^7$ and $R^8$ is a sulfo group.

In the formula (2), there are no particular limitations on the substitution positions of $R^6$, $R^7$ and $R^8$ which are substituted on the same benzene ring.

Preferably, the substitution positions are the following combinations (i) to (k) when the substitution position of the nitrogen atom (of the pyrazolone ring) substituted on the benzene ring is designated as the 1-position.
(i) When any one of $R^6$, $R^7$ and $R^8$ is other than a hydrogen atom, the 2-position, the 4-position, and the 5-position; or the 2-position, the 4-position, and the 6-position.
(j) When two of $R^6$, $R^7$ and $R^8$ are a group other than a hydrogen atom, and the other one of $R^6$, $R^7$ and $R^8$ is a hydrogen atom, the groups other than a hydrogen atom are at the 2-position and the 4-position; the 2-position and the 5-position; or the 3-position and the 5-position.
(k) When one of $R^6$, $R^7$ and $R^8$ is a group other than a hydrogen atom, and the other two of $R^6$, $R^7$ and $R^8$ are a hydrogen atom, the groups other than a hydrogen atom are at the 4-position.

A compound of a combination of the preferred ones described for the substituents and the substitution positions thereof for the formulae (1) and (2) is more preferred, and a compound of a combination of the more preferred ones is further preferred. A combination of further preferred ones, a combination of the preferred ones and the more preferred ones, and the like also are preferred.

Specific examples of the compound represented by the formula (1) preferably include those in which the substitution position of the nitro group is the 4-position when the substitution position of the azo group on the benzene ring to which the nitro group is substituted, is designated as the 1-position; the substitution position of the group A is the 4-position when the substitution position of the azo group on the benzene ring to which the group A is substituted, is designated as the 1-position; n is 1; $R^1$, $R^3$ and $R^7$ are a sulfo group; $R^2$ is a hydrogen atom; $R^4$ is a hydrogen atom, a chlorine atom, or a sulfo group; and $R^5$ is a carboxy group.

Specific preferred examples of the compound represented by the formula (1) includes those described in the following Tables 1 to 4, but the compound represented by the formula (1) is not limited to these specific examples.

TABLE 1

| Compound No. | Structural formula |
|---|---|
| 1 | |
| 2 | |
| 3 | |
| 4 | |
| 5 | |
| 6 | |
| 7 | |

TABLE 2

| Compound No. | Structural formula |
|---|---|
| 8 | (structure) |
| 9 | (structure) |
| 10 | (structure) |
| 11 | (structure) |
| 12 | (structure) |
| 13 | (structure) |

TABLE 2-continued
| Compound No. | Structural formula |
|---|---|
| 14 | 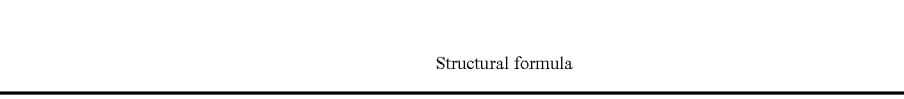 |
TABLE 3
| Compound No. | Structural formula |
|---|---|
| 15 | |
| 16 | |
| 17 | |
| 18 | |

TABLE 3-continued

| Compound No. | Structural formula |
|---|---|
| 19 | (chemical structure) |
| 20 | (chemical structure) |

TABLE 4

| Compound No. | Structural formula |
|---|---|
| 21 | (chemical structure) |
| 22 | (chemical structure) |
| 23 | (chemical structure) |
| 24 | (chemical structure) |

TABLE 4-continued

| Compound No. | Structural formula |
|---|---|
| 25 | 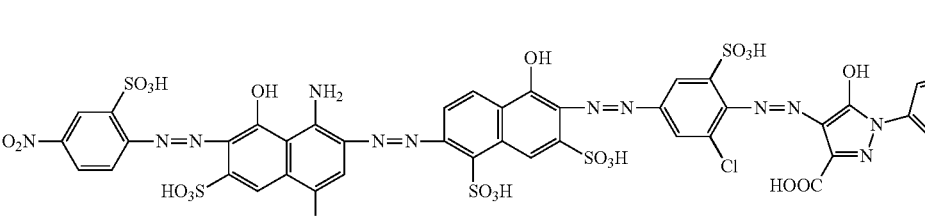 |
| 26 | 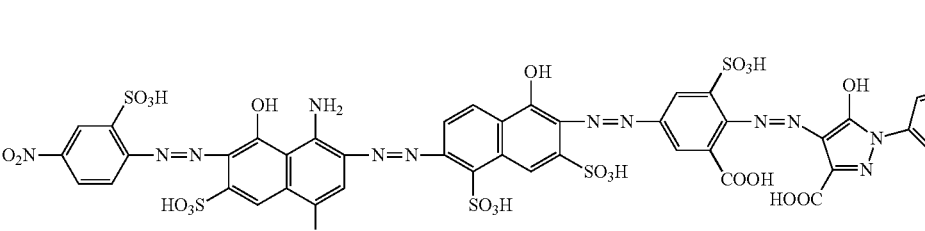 |
| 27 | 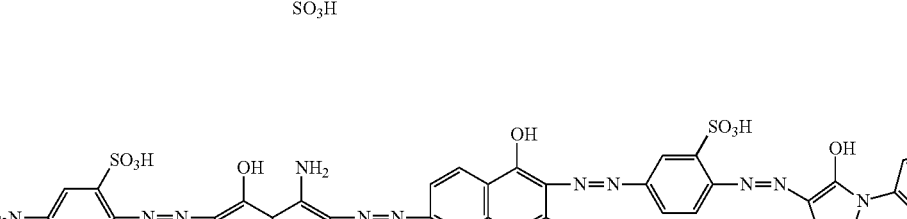 |

The coloring matter (II) contained in the ink composition of the present invention will be described.

The coloring matter (II) contained in the ink composition of the present invention is a compound represented by the formula (3). The coloring matter (II) is composed of at least one kind of the compound represented by the formula (3), and may be a coloring matter composed of a single compound represented by the formula (3), or may be a mixture of coloring matters composed of multiple compounds represented by the formula (3). Meanwhile, the compound represented by the formula (3) is a water-soluble dye.

Here, the compound represented by the formula (3) will be described.

The compound represented by the formula (3) has a tautomer, and isomers and the like represented by the following formulae (5) to (7) in addition to the formula (3), and the like are contemplated. These tautomers are also encompassed in the present invention.

Meanwhile, $R^{101}$ to $R^{103}$ in the following formulae (5) to (7) all have the same meanings as $R^{101}$ to $R^{103}$ in the formula (3).

(5)

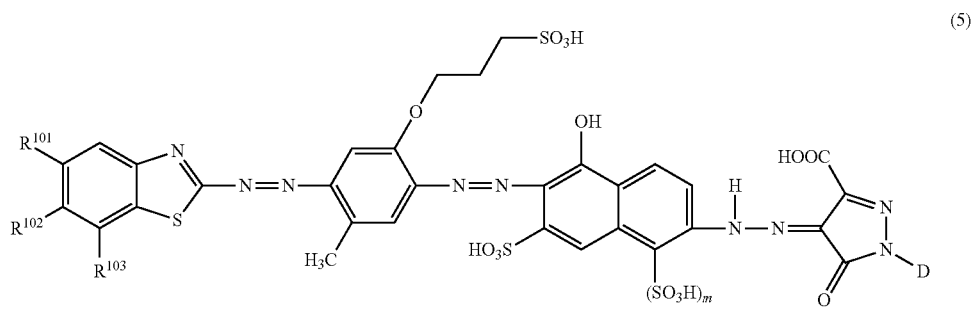

-continued

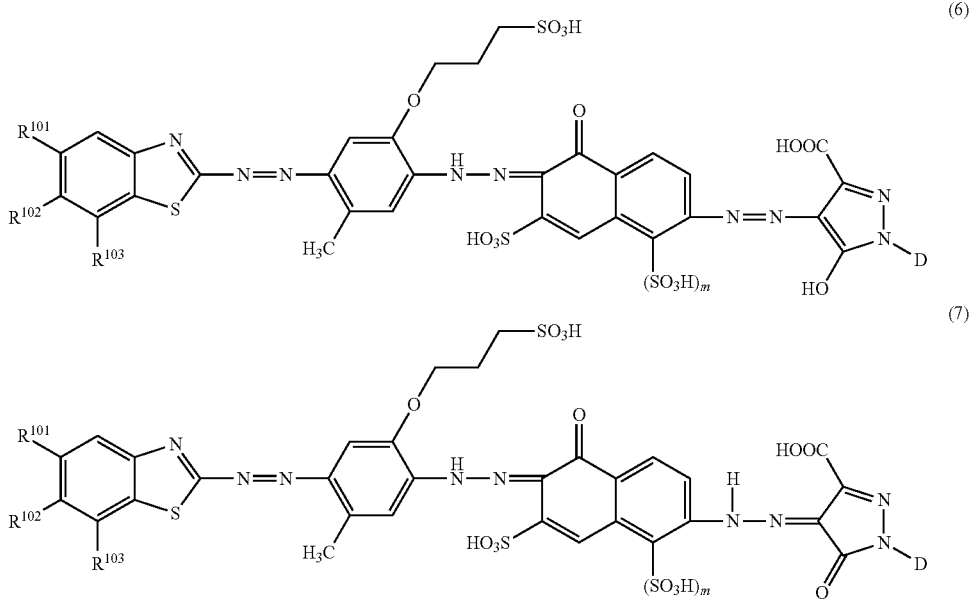

In the formula (3), m is 0 or 1, $R^{101}$ to $R^{103}$ each independently represent a hydrogen atom; a sulfo group; or a C1-C4 alkoxy group.

The combination of $R^{101}$ to $R^{103}$ in the formula (3) is preferably a combination of a sulfo group as $R^{101}$, a C1-C4 alkoxy group as $R^{102}$ and a hydrogen atom as $R^{103}$; or a combination of a hydrogen atom as $R^{101}$, a C1-C4 alkoxy group as $R^{102}$ and a sulfo group as $R^{103}$.

In the formula (3), m is preferably 1.

In the formula (3), the group D is a phenyl group or a naphthyl group substituted with one to three sulfo groups.

In the formula (3), when the group D is a phenyl group, the number of the sulfo group is one to three, preferably one or two. When multiple groups are substituted, there are no particular limitations on the positions of the substituents. However, it is preferable that the substituents are substituted respectively at the 2-position, the 3-position, and the 5-position when the number of the substituents is three; the 2-position and the 4-position, or the 3-position and the 5-position when the number of the substituents is two; or the 4-position when the number of the substituents is one, when the position of the bond with the nitrogen atom of the pyrazolone ring is designated as the 1-position. Specific examples include 2-sulfophenyl, 4-sulfophenyl, 2,4-disulfophenyl, 3,5-disulfophenyl and the like. 4-Sulfophenyl or 3,5-disulfophenyl is particularly preferred.

When the group D is a naphthyl group in the formula (3), the number of sulfo groups is one to three. The position of the bond of the group D with the nitrogen atom of the pyrazolone ring is preferably the 1-position or the 2-position, i.e., 1-naphthyl or 2-naphthyl is preferred.

There are no particular limitations on the position of the sulfo group on the naphthyl group, but those described below are preferred.

Specifically,

When the group D is a 1-naphthyl group (l) When the number of the sulfo groups is one, the 3-, 4-, 5-, 6- and 7-positions.

(m) When the number of the sulfo groups is two, the combinations of the 3-position and the 4-position, the 3-position and the 5-position, the 3-position and the 6-position, the 3-position and the 7-position, the 4-position and the 6-position, the 4-position and the 7-position, and the 5-position and the 7-position.

(n) When the number of the sulfo groups is three, the combinations of the 3-position, the 4-position and the 6-position, the 3-position, the 4-position and the 7-position, the 3-position, the 5-position and the 6-position, the 3-position, the 5-position and the 7-position, and the 3-position, the 6-position and the 7-position.

When the group D is a 2-naphthyl group (o) When the number of the sulfo groups is one, the 4-, 5-, 6-, 7-, and 8-positions.

(p) When the number of the sulfo groups is two, the combinations of the 4-position and the 6-position, the 4-position and the 7-position, the 4-position and 8-position, the 5-position and the 6-position, the 5-position and the 7-position, the 5-position and 8-position, and the 6-position and 8-position.

(q) When the number of the sulfo groups is three, the combinations of the 4-position, the 6-position and the 7-position, the 4-position, the 6-position and 8-position, and the 4-position, the 7-position and 8-position.

Specific examples include 7-sulfonaphth-1-yl, 5,7-disulfonaphth-2-yl, 6,8-disulfonaphth-2-yl, 4,8-disulfonaphth-2-yl, 4,6,8-trisulfonaphth-2-yl, 4,7,8-trisulfonaphth-2-yl and the like.

Among these, 4,6,8-trisulfonaphth-2-yl is particularly preferred.

A compound of a combination of the preferred ones described for the substituents of the formula (3) is more preferred, and a compound of a combination of the more preferred ones is further preferred. A combination of further preferred ones, a combination of the preferred ones and the more preferred ones, and the like also are preferred.

Specific examples of the compound represented by the formula (3) preferably include compounds in which m is 1, $R^{101}$ is a hydrogen atom or a sulfo group, $R^{102}$ is a C1-C4 alkoxy group, $R^{103}$ is a hydrogen atom or a sulfo group, and the group D is any one of a phenyl group substituted with one or two sulfo groups, and a naphthyl group substituted with three sulfo groups.

There are no particular limitations on specific examples of a suitable compound represented by the formula (3), but the specific examples include the compound presented in the following Tables 5 to 7, and the like.

The functional groups such as a sulfo group and a carboxy group in each table are described in the form of free acid for convenience.

TABLE 5
| Compound No. | Structural formula |
| --- | --- |
| 28 | 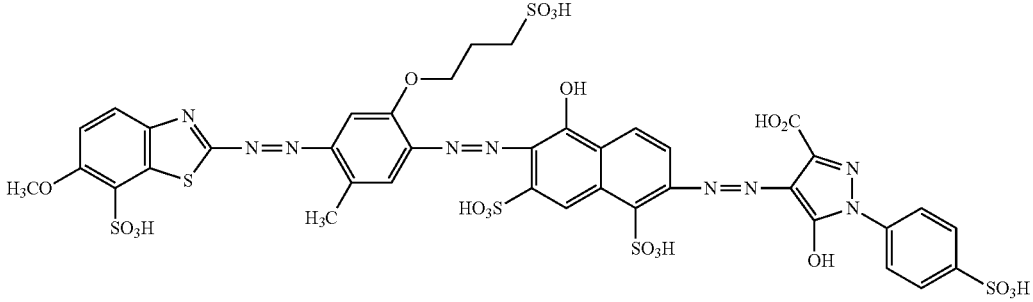 [SMILES: COc1ccc2nc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)sc2c1S(=O)(=O)O] |
| 29 | 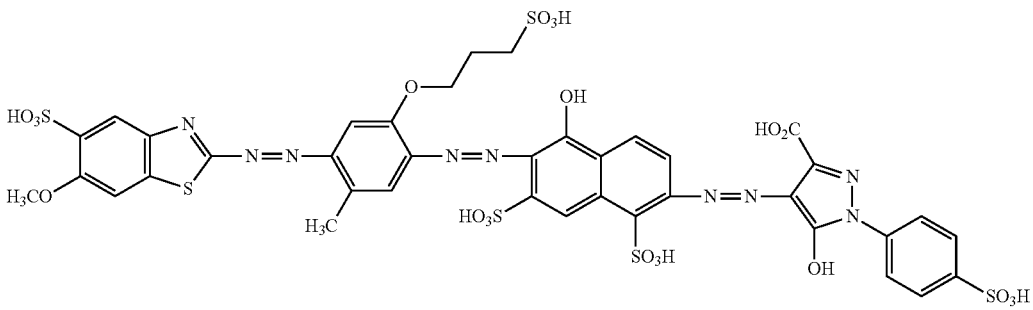 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)nc2cc1S(=O)(=O)O] |
| 30 | 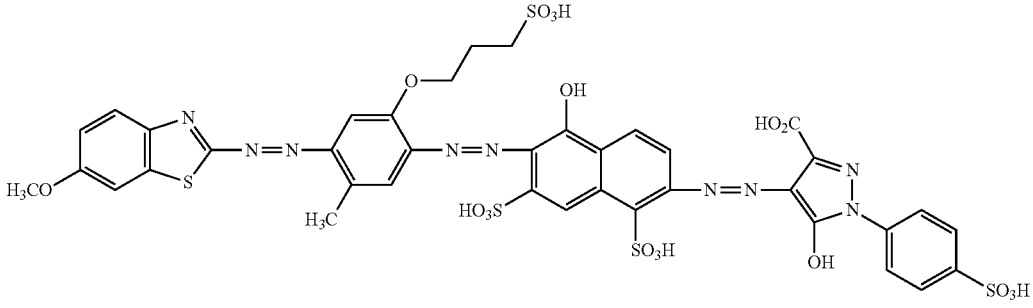 [SMILES: COc1ccc2nc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)sc2c1] |
| 31 | 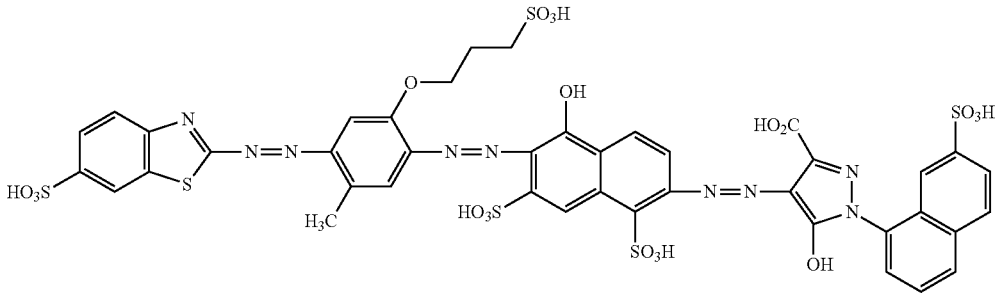 [SMILES: Cc1cc(N=Nc2c(S(=O)(=O)O)cc3c(S(=O)(=O)O)c(N=Nc4c(C(=O)O)nn(-c5cccc6ccc(S(=O)(=O)O)cc56)c4O)ccc3c2O)c(OCCCS(=O)(=O)O)cc1N=Nc1nc2ccc(S(=O)(=O)O)cc2s1] |

TABLE 5-continued

| Compound No. | Structural formula |
| --- | --- |
| 32 | |

TABLE 6

| Compound No. | Structural formula |
| --- | --- |
| 33 | |
| 34 | |
| 35 | |

TABLE 6-continued

| Compound No. | Structural formula |
|---|---|
| 36 | |
| 37 | |

TABLE 7

| Compound No. | Structural formula |
|---|---|
| 38 | |
| 39 | |

TABLE 7-continued

| Compound No. | Structural formula |
|---|---|
| 40 | 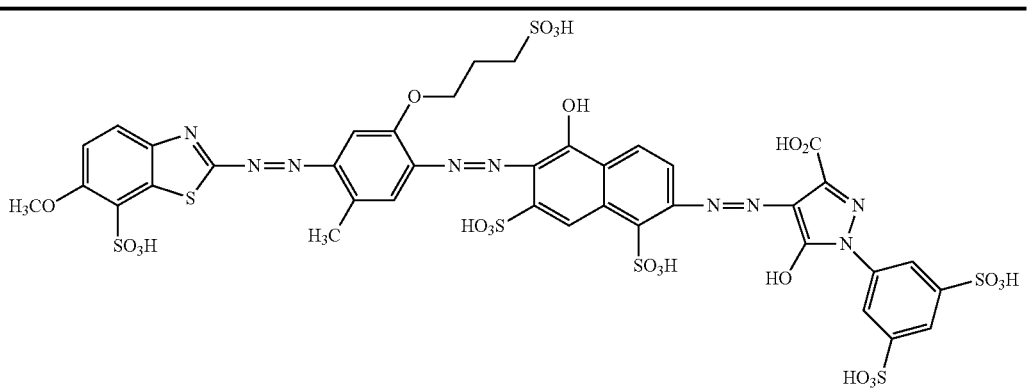 |
| 41 | 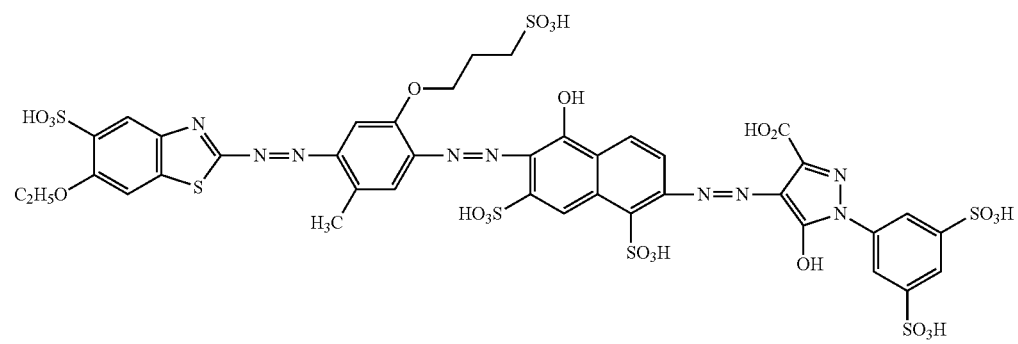 |
| 42 | 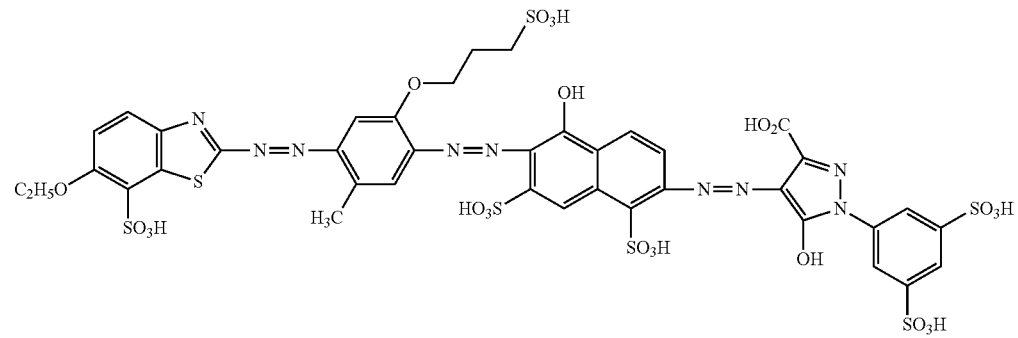 |

The coloring matter (III) contained in the ink composition of the present invention will be described.

The coloring matter (III) contained in the ink composition of the present invention is a compound represented by the formula (4). The coloring matter (III) is composed of at least one kind of the compound represented by the formula (4), may be a coloring matter composed of a single compound represented by the formula (4), or may be a mixture of coloring matters composed of multiple compounds. Meanwhile, the compound represented by the formula (4) is a water-soluble dye.

Here, the compound represented by the formula (4) will be described.

$R^{201}$ to $R^{204}$ in the formula (4) each independently represent a hydrogen atom; or a C1-C4 alkoxy group substituted with a sulfo group.

The C1-C4 alkoxy group substituted with a sulfo group may be a C1-C4 alkoxy group having a sulfo group on any arbitrary carbon atom thereof. The number of the substituents is usually one or two, and preferably one. There are no particular limitations on the position of the substituent, but it is preferable that two or more oxygen atoms do not substitute the same carbon atom.

Specific examples include sulfo-C1-C4 alkoxy groups such as 2-sulfoethoxy, 3-sulfopropoxy, and 4-sulfobutoxy. 3-sulfopropoxy is particularly preferred.

Specific examples preferably include a compound represented by the formula (4) in which at least one of $R^{201}$ and $R^{202}$ is a sulfopropoxy group, and at least one of $R^{203}$ and $R^{204}$ is a sulfopropoxy group.

There are no particular limitations on the suitable specific examples of the compound represented by the formula (4), but some suitable specific examples include the compounds presented in the following Tables 8 and 9, etc.

In the respective tables, the functional groups such as a sulfo group and a carboxy group are indicated in the form of free acid, for convenience.

TABLE 8
| Compound No. | Structural formula |
|---|---|
| 43 | 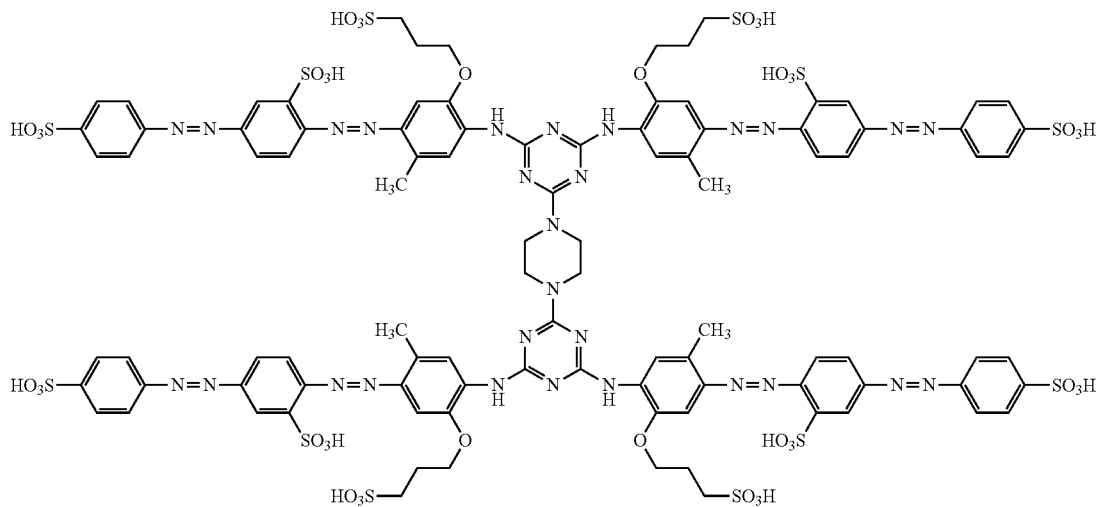 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |
| 44 | 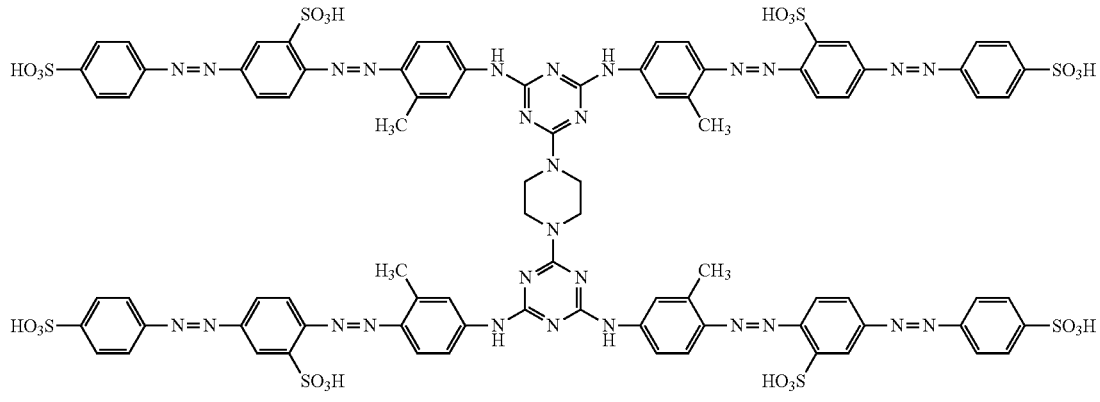 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3)n2)ccc1N=Nc1ccc(N=Nc2ccc(S(=O)(=O)O)cc2)cc1S(=O)(=O)O] |
| 45 | 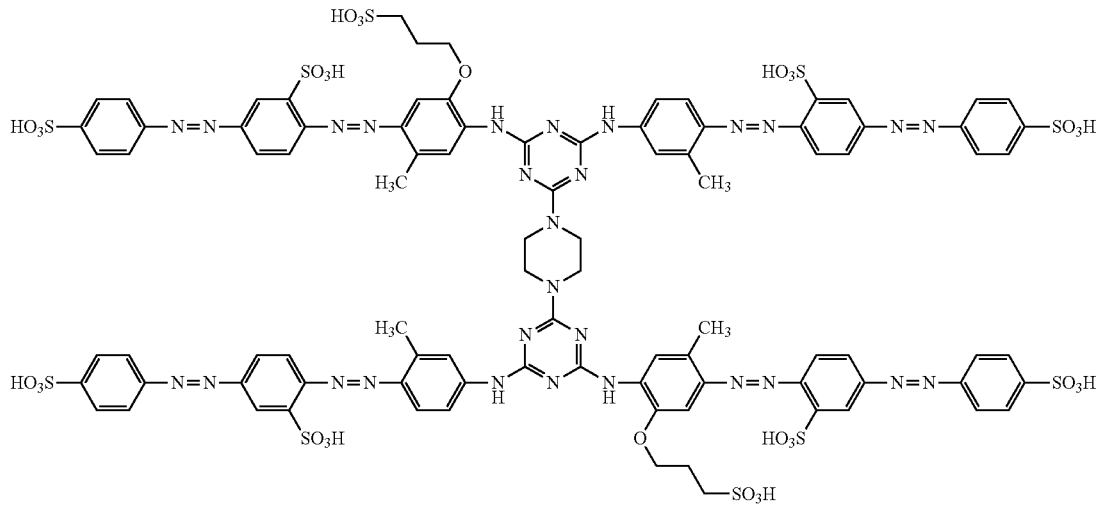 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 9

| Compound No. | Structural formula |
|---|---|
| 46 | (structure shown) |
| 47 | (structure shown) |

The coloring matters (I), (II) and (III) are preferably mixed in a combination ratio such that the ratio of the coloring matter (I) is 10 to 80% by mass, the ratio of the coloring matter (II) is 10 to 80% by mass, and the ratio of the coloring matter (III) is 10 to 40% by mass in the total mass of the coloring matters contained in the ink composition of the present invention. The combination ratio is further preferably such that the ratio of the coloring matter (I) is 20 to 70% by mass, the ratio of the coloring matter (II) is 20 to 70% by mass, and the ratio of the coloring matter (III) is 10 to 40% by mass.

A salt of the compounds represented by the formulae (1), (3) and (4) or a tautomer thereof is a salt with an inorganic or organic cation. Among them, specific examples of the inorganic salts include alkaline metal salts, alkaline earth metal salts, and ammonium salts. Examples of preferred inorganic salts include respective salts with lithium, sodium and potassium, and ammonium salts. On the other hand, examples of the salt with organic cations include, for example, but not limited to, salts with quaternary ammonium represented by the following formula (8). Furthermore, free acid, a tautomer thereof, and various salts thereof may be in a mixture. For example, any combinations may be used such as a mixture of a sodium salt and an ammonium salt, a mixture of a free acid and a sodium salt, and a mixture of lithium salt, a sodium salt, and an ammonium salt. In some cases, the properties of respective compounds such as solubility may vary depending on the type of the salt. Thus, it is possible to obtain a mixture having properties that suit the purpose by appropriately selecting the type of the salt as necessary; by changing the ratios of salts if the system contains plural salts and the like; or the like.

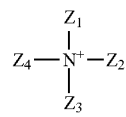

$$Z_4 - \overset{Z_1}{\underset{Z_3}{N^+}} - Z_2 \quad (8)$$

In the formula (8), $Z^1$, $Z^2$, $Z^3$ and $Z^4$ each independently represent a group selected from the group consisting of a hydrogen atom, an alkyl group, a hydroxyalkyl group, and a hydroxyalkoxyalkyl group, and at least any one of them represents a group other than a hydrogen atom.

Specific examples of the alkyl group of $Z^1$, $Z^2$, $Z^3$ and $Z^4$ for the formula (8) include methyl, ethyl, n-propyl, isopropyl, n-butyl, isobutyl, sec-butyl, t-butyl and the like. Specific examples of the hydroxyalkyl group include hydroxy-C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl. Examples of the hydroxyalkoxyalkyl group include hydroxy-C1-C4 alkoxy-C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl. Among these, hydroxyethoxy-C1-C4 alkyl is preferred. Particularly preferred examples include a hydrogen atom; methyl; hydroxy-C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; and hydroxyethoxy-C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of the combinations of $Z^1$, $Z^2$, $Z^3$, and $Z^4$ for preferred compounds of the formula (8) are presented in the following Table 10.

TABLE 10

| Compound No. | $Z^1$ | $Z^2$ | $Z^3$ | $Z^4$ |
|---|---|---|---|---|
| 1-1 | H | CH$_3$ | CH$_3$ | CH$_3$ |
| 1-2 | CH$_3$ | CH$_3$ | CH$_3$ | CH$_3$ |
| 1-3 | H | —C$_2$H$_4$OH | —C$_2$H$_4$OH | —C$_2$H$_4$OH |
| 1-4 | CH$_3$ | —C$_2$H$_4$OH | —C$_2$H$_4$OH | —C$_2$H$_4$OH |
| 1-5 | H | —CH$_2$CH(OH)CH$_3$ | —CH$_2$CH(OH)CH$_3$ | —CH$_2$CH(OH)CH$_3$ |
| 1-6 | CH$_3$ | —CH$_2$CH(OH)CH$_3$ | —CH$_2$CH(OH)CH$_3$ | —CH$_2$CH(OH)CH$_3$ |
| 1-7 | H | —C$_2$H$_4$OH | H | —C$_2$H$_4$OH |
| 1-8 | CH$_3$ | —C$_2$H$_4$OH | H | —C$_2$H$_4$OH |
| 1-9 | H | —CH$_2$CH(OH)CH$_3$ | H | —CH$_2$CH(OH)CH$_3$ |
| 1-10 | CH$_3$ | —CH$_2$CH(OH)CH$_3$ | H | —CH$_2$CH(OH)CH$_3$ |
| 1-11 | CH$_3$ | —C$_2$H$_4$OH | CH$_3$ | —C$_2$H$_4$OH |
| 1-12 | CH$_3$ | —CH$_2$CH(OH)CH$_3$ | CH$_3$ | —CH$_2$CH(OH)CH$_3$ |

A method of synthesizing respective compounds represented by the formulae (1), (3) and (4) will be described.

The compound represented by the formula (1) can be easily synthesized by a person having ordinary skill in the art in accordance with the method described in PCT International Application, Publication No. 2005/097912, or a similar method thereto by appropriately selecting synthetic raw materials based on the method described in the publication.

The compound represented by the formula (3) can be easily synthesized by a person having ordinary skill in the art in accordance with the method described in Japanese Unexamined Patent Application, Publication No. 2009-84346, or a similar method thereto by appropriately selecting synthetic raw materials based on the method described in the publication.

The compounds represented by the formula (4) can be synthesized by, for example, a method such as described below.

Meanwhile, the structural formulas of the compounds given in each step are expressed in the form of a free acid, and $R^{201}$ to $R^{204}$ that are appropriately used in the following formulae (9) to (25) have the same meanings as $R^{201}$ to $R^{204}$, respectively, as defined for the formula (4).

First, a compound represented by the following formula (9) is diazotized by a routine method, and this product and a compound represented by the following formula (10) are subjected to a coupling reaction by a routine method. Thus, a compound represented by the following formula (11) is obtained.

As another synthesis method for the compound represented by the formula (11), the following method may be used. Specifically, a compound represented by the following formula (9) is diazotized by a routine method, and this product and a methyl-ω-sulfonic acid derivative of aniline are subjected to a coupling reaction by a routine method and then to hydrolysis under alkaline conditions. Thus, a compound represented by the following formula (12) is obtained. The compound represented by the formula (12) thus obtained is sulfonated by treating the compound with fuming sulfuric acid or the like. Thus, a compound represented by the formula (11) can be obtained. Furthermore, among the compounds represented by the formula (11), there are also products available as commercial products (for example, C.I. Acid yellow 9).

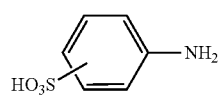

(9)

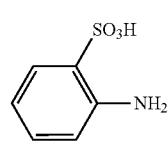

(10)

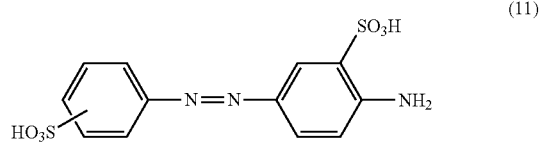

(11)

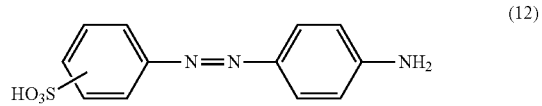

(12)

Subsequently, the compound represented by the formula (11) thus obtained is diazotized by a routine method, and then this product and a compound represented by the following formula (13) are subjected to a coupling reaction by a routine method. Thus, a compound represented by the following formula (14) is obtained.

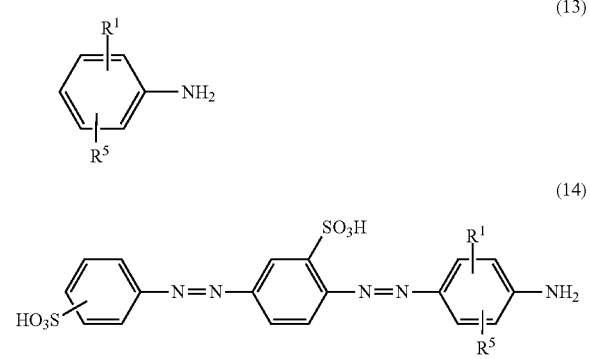

On the other hand, the compound represented by the formula (11) is diazotized by a routine method, and then this product and a compound represented by the following formula (15) are subjected to a coupling reaction by a routine method. Thus, a compound represented by the following formula (16) is obtained.

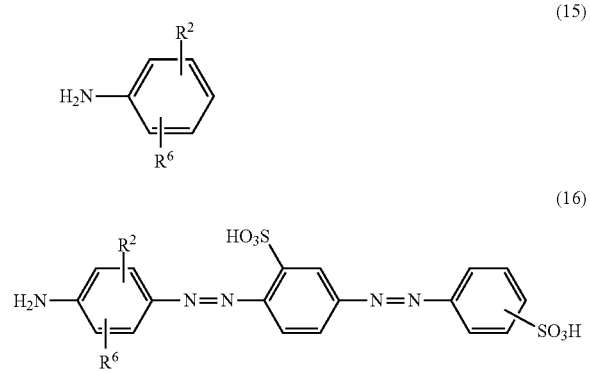

In the same manner, the compound represented by the formula (11) is diazotized by a routine method, and then this product and a compound represented by the following formula (17) are subjected to a coupling reaction by a routine method. Thus, a compound represented by the following formula (18) is obtained.

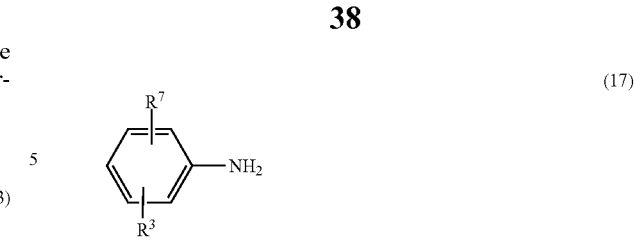

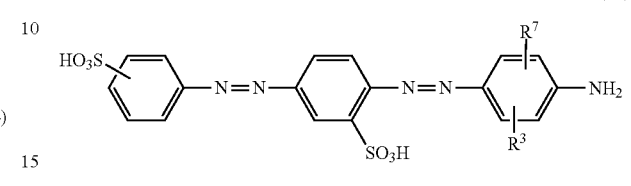

In the same manner, the compound represented by the following formula (11) is diazotized by a routine method, and then this product and a compound represented by the following formula (19) are subjected to a coupling reaction by a routine method. Thus, a compound represented by the following formula (20) is obtained.

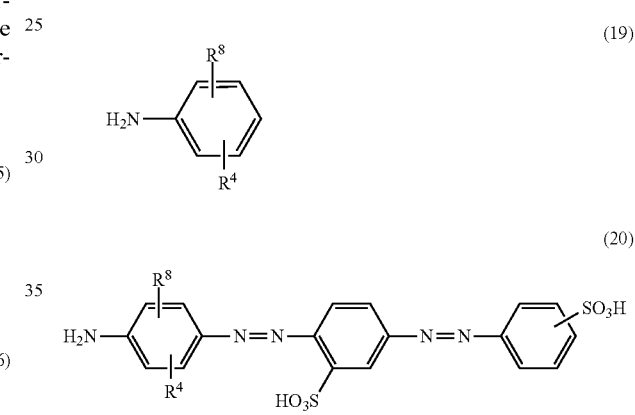

Then, the compound represented by the formula (14) thus obtained is subjected to a condensation reaction with a cyanuric halide, for example, cyanuric chloride, by a routine method, and thus a compound represented by the following formula (21) is obtained.

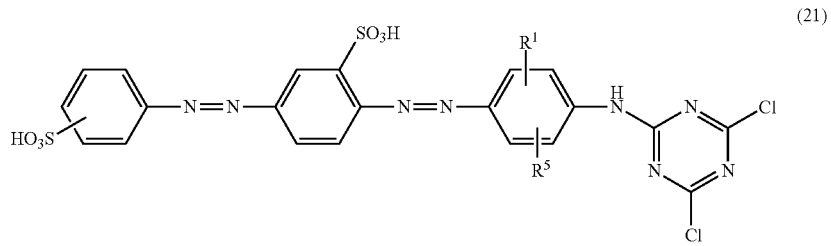

Subsequently, the compound represented by the formula (21) thus obtained is subjected to a condensation reaction with the compound represented by the formula (16) by a routine method, and thus a compound represented by the following formula (22) is obtained.

(22)

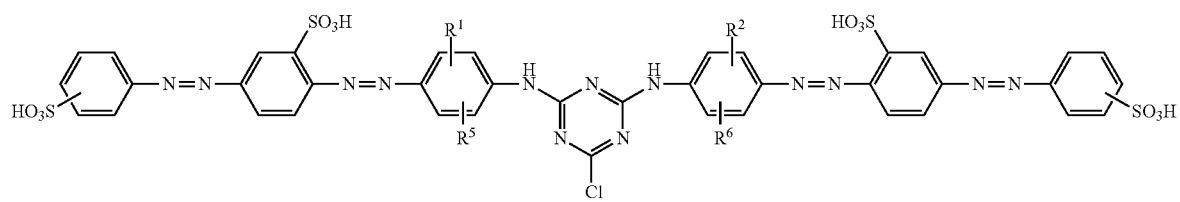

In the same manner, the compound represented by the formula (18) thus obtained is subjected to a condensation reaction with a cyanuric halide, for example, cyanuric chloride, by a routine method, and thus a compound represented by the following formula (23) is obtained.

advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling (23)

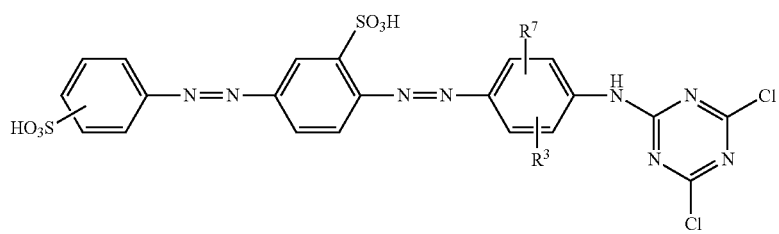

Subsequently, the compound represented by the formula (23) thus obtained is subjected to a condensation reaction with the compound represented by the formula (20) by a routine method, and thus a compound represented by the following formula (24) is obtained.

reaction, the reaction system is even further acidified. Therefore, it is preferable to adjust the reaction liquid to the pH value described above by adding a base. Examples of the base that can be used include alkali metal hydroxides such as lithium hydroxide and sodium hydroxide; alkali metal car- (24)

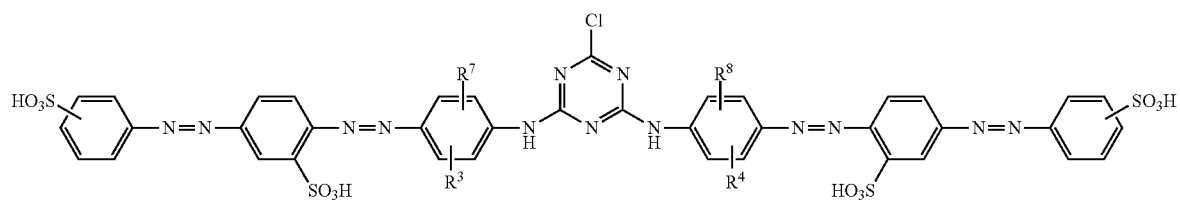

The compound represented by the formula (22), the compound represented by the formula (24) thus obtained, and a compound represented by the following formula (25), which corresponds to the crosslinking group X, are subjected to a condensation reaction by a routine method. Thus, the azo compound represented by the formula (4) can be obtained.

(25)

The diazotization of the compound represented by the formula (9) is carried out by a method that is known per se. For example, the diazotization is carried out in an inorganic acid medium at a temperature of, for example, −5° C. to 30° C., and preferably 0° C. to 20° C., using a nitrous acid salt, for example, a nitrous acid alkali metal salt such as sodium nitrite.

The coupling reaction between a diazotization product of a compound represented by the formula (9) and a compound represented by the formula (10) is also carried out under reaction conditions that are known per se. For example, it is bonates such as lithium carbonate, sodium carbonate, and potassium carbonate; acetates such as sodium acetate; ammonia or organic amines. The compound represented by the formula (9) and the compound represented by the formula (10) are used in nearly stoichiometric amounts.

The diazotization of the compound represented by the formula (11) is carried out by a method that is known per se. For example, the diazotization is carried out in an inorganic acid medium at a temperature of, for example, −5° C. to 30° C., and preferably 0° C. to 25° C., using a nitrous acid salt, for example, a nitric acid alkali metal salt such as sodium nitrite.

The coupling reaction between a diazotization product of a compound represented by the formula (11) and a compound represented by the formula (13), formula (15), formula (17) or formula (19) is also carried out under reaction conditions that are known per se. For example, it is advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling reaction, the reaction system is even further acidified. Therefore, it is preferable to adjust the reaction liquid to the pH value described above by adding a base. As the base, the same compounds as those described above can be used. The compound of the formula (11) and the compound of the formula (13), the formula (15), the formula (17), or the formula (19) are used in nearly stoichiometric amounts.

The condensation reaction between a compound represented by the formula (14) or the formula (18) and a cyanuric halide, for example, cyanuric chloride is carried out by a method that is known per se. For example, it is advantageous to carry out the reaction in water or an aqueous organic medium at a temperature of 0° C. to 30° C., and preferably 5° C. to 25° C., and at a pH of a weakly acidic to neutral value, for example, at pH 3 to 8. With the progress of the reaction, the reaction system is acidified, and therefore, it is preferable to adjust the system to the pH value described above by adding a base. As the base, the same compounds as those described above can be used. The compound represented by the formula (14) or the formula (18) and cyanuric halide are used in nearly stoichiometric amounts.

The condensation reaction between a compound represented by the formula (16) and a compound represented by the formula (21), or the condensation reaction between a compound represented by the formula (20) and a compound represented by the formula (23) is carried out by a method that is known per se. For example, it is advantageous to carry out the reaction in water or an aqueous organic medium at a temperature of 10° C. to 80° C., and preferably 25° C. to 70° C., and at a pH of a weakly acidic to weakly alkaline value, for example, at pH 5 to 9. The adjustment of the pH value is carried out by adding a base. As the base, the same compounds as those described above can be used. The compound represented by the formula (16) and the compound represented by the formula (21), or the compound represented by the formula (20) and the compound represented by the formula (23) are used in nearly stoichiometric amounts.

The condensation reaction of the compound represented by the formula (22) and the compound represented by the formula (24) and the compound represented by the formula (25) is carried out by a method that is known per se. For example, it is advantageous to carry out the reaction in water or an aqueous organic medium at a temperature of 50° C. to 100° C., and preferably 60° C. to 95° C., and at a pH of a neutral to weakly alkaline value, for example, at pH 7 to 10. The adjustment of the pH value is carried out by adding a base. As the base, the same compounds as those described above can be used. The compound represented by formula (25) is used in an amount of 0.4 to 0.6 equivalents, and preferably 0.5 equivalents, relative to one equivalent of the compound represented by formula (22) and one equivalent of the compound represented by formula (24).

Examples of the method of synthesizing a desired salt of the compounds represented by the formulae (1), (3), and (4) include a method of adding, after completion of the final step in the synthesis reaction for the respective compounds, a desired inorganic salt or a desired organic cation salt to the reaction liquid, and salting out; or a method of adding a mineral acid such as hydrochloric acid to the reaction liquid to isolate the compounds in the form of free acid from the reaction liquid, subsequently washing the free acid thus obtained with water, acidic water, an aqueous organic medium or the like as necessary, to remove inorganic salts, and then neutralizing the free acid in an aqueous medium by means of a desired inorganic or organic base. Through such methods, a desired salt of the compound can be obtained in the form of a solid of corresponding salt or a solution thereof. Here, the term acidic water means, for example, a solution prepared by dissolving a mineral acid such as sulfuric acid or hydrochloric acid, or an organic acid such as acetic acid in water, and acidifying the water. Further, examples of the aqueous organic medium include a mixture of water with an organic substance that is miscible with water, or so-called an organic solvent that is miscible with water (specific examples thereof include water-soluble organic solvents and the like that will be described below), and the like. Examples of the inorganic salt include alkaline metal salts such as lithium chloride, sodium chloride and potassium chloride; ammonium salts such as ammonium chloride and ammonium bromide; and the like. Examples of the organic cation salt include halide salts of the quaternary ammonium represented by the formula (8) and the like. Examples of the inorganic base include, for example, alkaline metal hydroxides such as lithium hydroxide, sodium hydroxide and potassium hydroxide; ammonium hydroxide (aqueous ammonia); alkaline metal carbonates such as lithium carbonate, sodium carbonate and potassium carbonate; and the like. Examples of the organic base include, but are not limited to, organic amines such as diethanolamine and triethanolamine; hydroxides or halides of the quaternary ammonium represented by the formula (8); and the like.

The ink composition of the present invention will be described.

The respective reaction liquids after completion of the final step in the respective synthesis reactions for the compounds represented by the formulae (1), (3) and (4) can be directly used in the preparation of the ink composition of the present invention. Furthermore, the respective compounds can be isolated from the reaction liquid by methods such as, for example, drying, for example, spray-drying the reaction liquid containing the respective coloring matters individually first; adding inorganic salts such as sodium chloride, potassium chloride, calcium chloride and sodium sulfate, and salting out; adding mineral acids such as hydrochloric acid, sulfuric acid and nitric acid, and acid-precipitating; acid salting out by combining the salting out and the acid-precipitation; and the like, and these respective compounds can be mixed whereby to prepare an ink composition.

Preferred coloring matters as the coloring matter (I) contained in the ink composition of the present invention are the compounds exemplified as the preferred ones in the respective compounds represented by the formula (1). The same applies also to more preferred coloring matters and the like. Furthermore, preferred coloring matters as the coloring matter (II) are similarly the compounds exemplified as preferred ones in the compound represented by the formula (3). The same applies also to more preferred coloring matter and the like. Furthermore, the coloring matter as the coloring matter (III) is preferably the compound exemplified as the preferred ones in the compound represented by the formula (4) in a similar manner. The same applies also to more preferable coloring matters, and the like.

Examples of combinations of the coloring matters (I), (II), and (III) include combinations of the compound represented by No. 25 as described in Table 4 as the coloring matter (I), the compound represented by No. 28 or No. 29 as described in Table 5, No. 32 as described in Table 5, the compound represented by No. 33 as described in Table 6, or the compound represented by No. 38 or No. 40 as described in Table 7 as the coloring matter (II), and the compound represented by No. 43 or No. 45 as described in Table 8 as the coloring matter (III).

The ink composition of the present invention containing this combination of the coloring matters is preferred one as the ink composition of the present invention.

The ink composition of the present invention contains the coloring matter (I), the coloring matter (II), and the coloring matter (III) as coloring matters. Each of the coloring matters (I), (II), and (III) may be a single coloring matter, respectively to the extent that satisfies the specific conditions described above, or may be a mixture of multiple coloring matters, respectively. Therefore, the ink composition of the present invention is a combination of at least 3 kinds or more of the coloring matters.

The ratio of the coloring matter (I) is 10 to 80% by mass, preferably 20 to 70% by mass, and more preferably 20 to 65% by mass, the ratio of the coloring matter (II) is 10 to 80% by mass, preferably 20 to 70% by mass, and more preferably 20 to 65% by mass, and the ratio of the coloring matter (III) is 10 to 40% by mass in the total mass of the coloring matter contained in the ink composition of the present invention.

Furthermore, the total content of coloring matter (I), the coloring matter (II), and the coloring matter (III) in the total mass of the ink composition of the present invention is usually 0.1 to 20% by mass, preferably 1 to 10% by mass, and more preferably 2 to 8% by mass, relative to the total mass of the ink composition.

The ink composition of the present invention may further contain a water-soluble organic solvent in, for example, 0 to 30% by mass, and an ink preparation agents in, for example, 0 to 20% by mass, and water to the balance.

The ink composition of the present invention is prepared by using water as a medium, so that the ink composition may contain a water-soluble organic solvent if necessary, to the extent that the effect of the present invention is not impaired. The water-soluble organic solvent is used for the purpose of obtaining effects such as the dissolution of dyes, prevention of drying (maintenance of a wetted state), adjustment of viscosity, acceleration of penetration, adjustment of the surface tension, and defoaming in the ink composition of the present invention, and thus it is preferable that the water-soluble organic solvent be included in the ink composition of the present invention.

Examples of the ink preparation agents include known additives such as a preservative and fungicide, a pH adjusting agent, a chelating reagent, a rust-preventive agent, an ultraviolet ray absorbing agent, a water-soluble polymer compound, a coloring matter solubilizer, a surfactant, and an oxidation-preventive agent (a fading-preventive agent).

The content of the water-soluble organic solvent is 0% to 60% by mass, and preferably 10% to 50% by mass, relative to the total mass of the ink composition of the present invention, and it is desirable to use the ink formulating agents similarly in an amount of 0% to 20% by mass, and preferably 0% to 15% by mass. The balance other than the components described above is water.

The pH of the ink composition of the present invention is preferably pH 5 to 11, and more preferably pH 7 to 10 for the purpose of enhancing the storage stability. Furthermore, the surface tension of the ink composition is preferably 25 to 70 mN/m, and more preferably 25 to 60 mN/m. In addition, the viscosity of the ink composition is preferably 30 mPa·s or lower, and more preferably 20 mPa·s or lower. The pH and the surface tension of the ink composition of the present invention can be appropriately adjusted with the pH adjusting agent and the surfactant as described below.

In the case where the ink composition of the present invention is used as an ink for ink jet recording, it is preferable to use ink compositions having smaller contents of inorganic impurities such as chlorides of metal cations (for example, sodium chloride) and sulfates (for example, sodium sulfate) in respective coloring matters (specifically, the respective compounds represented by the formulae (1), (3) and (4)) contained in the ink composition of the present invention. The criteria for the content of the inorganic impurities is generally about 1% or lower by mass, relative to the total mass of the coloring matters, and the lower limit may be equal to or lower than the detection limit of the detecting instrument, that is, 0%. As a method of producing the compound with less inorganic impurities, for example, a desalting treatment may be carried out by an ordinary method of using a reverse osmosis membrane; a method of stirring a dried product or a wet cake of a coloring matter in a mixed solvent of C1-C4 alcohol such as methanol and water, and filtering and isolating the precipitate, and drying the product; a method of using an ion exchange resin; and the like.

Specific examples of the water-soluble organic solvent include C1-C4 alkanols such as methanol, ethanol, propanol, isopropanol, butanol isobutanol, secondary butanol and tertiary butanol; carboxylic amides such as N,N-dimethylformamide and N,N-dimethylacetamide; lactam such as 2-pyrrolidone, N-methyl-2-pyrrolidone, and N-methylpyrrolidin-2-one; cyclic ureas such as 1,3-dimethylimidazolidin-2-one and 1,3-dimethylhexahydropyrimid-2-one; ketones or keto alcohols such as acetone, methyl ethyl ketone, and 2-methyl-2-hydroxypentan-4-one; cyclic ethers such as tetrahydrofuran and dioxane; mono-, oligo- or polyalkylene glycols or thioglycols having a C2-C6 alkylene unit, such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol, thiodiglycol and dithiodiglycol; polyols (triols) such as trimethylolpropane, glycerin and hexane-1,2,6-triol; C1-C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; lactones such as γ-butyrolactone; and sulfoxide such as dimethyl sulfoxide. These water-soluble organic solvents may be used alone, or in combination of two kinds or more.

Among these, isopropanol, N-methyl-2-pyrrolidone, glycerin, butylcarbitol and the like are preferred.

Meanwhile, the water-soluble organic solvent described above also includes a substance that is solid at normal temperature such as trimethylolpropane. However, the substance and the like exhibits water-solubility as a solid, and further an aqueous solution containing the substance and the like exhibits similar properties to those of a water-soluble organic solvent, and can be used for the same purpose. For this reason, such solid substance is encompassed in the category of the water-soluble organic solvents in the present specification for convenience as long as it can be used for the same purpose described above.

Specific examples of the fungicide include dehydrosodium acetate, benzoate sodium, sodium pyridine thione-1-oxide, p-hydroxybenzoate ethyl ester, 1,2-benzisothiazolin-3-one and a salt thereof and the like.

Specific examples of the preservative include, for example, a compound of organic sulfur based, organic nitrogen sulfur based, organic halogen based, haloallyl sulfone based, iodopropargyl based, haloalkylthio based, nitrile based, pyridine based, 8-oxyquinoline based, isothiazoline based, dithiol based, pyridineoxide based, nitropropane based, organic tin based, phenol based, quaternary ammonium salt based, triazine based, thiazine based, anilide based, adamantane based, dithiocarbamate based, brominated indanone based, benzylbromoacetate based, inorganic salt based or the like.

Specific examples of the organic halogen based compound include, for example, sodium pentachlorophenol. Specific examples of the pyridineoxide based compound include, for example, sodium 2-pyridinethiol-1-oxide. Specific examples of the isothiazoline based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesiumchloride, 5-chloro-2-methyl-4-isothiazolin-3-one calciumchloride, 2-methyl-4-isothiazolin-3-one calciumchloride, and the like. Specific examples of the other preservative fungicide include anhydrous sodium acetate, sodium sorbate, sodium benzoate, or trade names Proxel® GXL (S) and Proxel® XL-2 (S) manufactured by Arch Chemical, Inc., and the like.

As used herein, the superscript notation of "RTM" means a registered trademark.

As the pH adjusting agent, an arbitrary substance can be used as long as the pH of the ink can be controlled to fall within the range of, for example, 5 to 11 without bad influences on the ink prepared. Specific examples thereof include alkanol amines such as diethanolamine, triethanolamine and N-methyldiethanolamine; alkaline metal hydroxides such as lithium hydroxide, sodium hydroxide and potassium hydroxide; ammonium hydroxide (aqueous ammonia); alkaline metal carbonates such as lithium carbonate, sodium carbonate, sodium hydrocarbonate and potassium carbonate; alkaline metal salts of an organic acid such as sodium silicate and potassium acetate; inorganic bases such as disodium phosphate; aminosulfonic acids such as taurine; and the like.

Specific examples of the chelating reagent include disodium ethylenediamine tetraacetate, sodium nitrilo triacetate, sodium hydroxyethylethylenediamine triacetate, sodium diethylenetriamine pentaacetate, sodium uracil diacetate and the like.

Specific examples of the rust-preventive agent include acidic sulfite, sodium thiosulfate, ammonium thioglycolate, diisopropylammonium nitrite, pentaerythritol tetranitrate, dicyclohexylammonium nitrite, and the like.

Specific examples of the ultraviolet ray absorbing agent include those water-soluble such as sulfonated benzophenone based compounds, benzotriazole based compounds, salicylic acid based compounds, cinnamic acid based compounds and triazine based compound.

Specific examples of the water-soluble polymer compound include polyvinyl alcohols, cellulose derivatives, polyamine, polyimine and the like.

Specific examples of the coloring matter solubilizer include ε-caprolactam, ethylene carbonate, urea and the like.

As the oxidation-preventive agent, various organic based and metal complex based discoloration-preventive agent can be used. Specific examples of the fading-preventive agent include hydroquinones, alkoxy phenols, dialkoxy phenols, phenols, anilines, amines, indanes, chromanes, alkoxy anilines, heterocycles and the like.

Specific examples of the surfactant include known surfactants such as anionic based surfactants, cationic based surfactants and nonionic based surfactants.

Examples of the anionic surfactant include alkyl sulfonic acid salts, alkylcarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol; and the like. Specific examples of commercially available products include (trade name) Surfynol® 104, 105, 82 and 465; and Olfine® STG, all manufactured by Nissin Chemical Industry Co., Ltd.

These ink preparation agents are used singly or as mixtures.

For the preparation of the ink composition of the present invention, there are no particular limitations on the order of dissolving respective agents such as additives. The water used at the time of preparing the ink composition is preferably water with low impurities, such as ion-exchanged water or distilled water. Furthermore, if necessary, any contaminants in the ink composition may be removed by performing precision filtration using a membrane filter and the like after the preparation of the ink composition. Particularly, in the case of using the ink composition of the present invention as an ink for ink jet recording, it is preferable to perform precision filtration. The pore size of the filter that is used to perform precision filtration is usually 1 μm to 0.1 μm, and preferably 0.8 μm to 0.1 μm.

The ink composition of the present invention is suitable for use in printing, copying, marking, writing, drawing, stamping or recording (printing), particularly ink jet recording. Furthermore, the ink composition of the present invention is such that solid precipitation does not easily occur even against drying in the vicinity of the nozzles of the recording head of ink jet printers, and for this reason, blockage of the recording head also does not easily occur.

The ink jet recording method of the present invention will be described. The ink jet recording method of the present invention is a method of using the ink composition of the present invention as an ink and discharging ink droplets of the ink in response to recording signals, and thus attaching the ink droplets onto a record-receiving material whereby to perform recording. The ink nozzles and the like that are used in the recording are not particularly limited, and can be appropriately selected in accordance with the purpose.

Examples of the recording method that may be adopted include known respective systems, for example, a charge control system which utilizes electrostatic attraction to discharge an ink; a drop-on-demand system (pressure pulse system) which utilizes vibration pressure of a piezo device; an acoustic ink jet system which changes an electric signal to acoustic beam and irradiates an ink with the acoustic beam, and utilizes the radiation pressure to discharge the ink; a thermal inkjet, specifically Bubblejet (registered trademark) system which forms bubbles by heating an ink, and utilizes generated pressure; and the like.

Meanwhile, the ink jet recording method also encompasses a system which injects an ink having low density of coloring matters (the content of the coloring matters) in the ink, which is called a photo ink, in a large number with a small volume; a system which utilizes multiple inks having different densities of coloring matters in an ink with a substantially identical hue to improve the image quality; a system which utilizes a colorless transparent ink; and the like.

The colored body of the present invention is a colored substance by means of
a) the ink composition of the present invention according to any one of the first to ninth aspects described above, or
b) the ink jet recording method of the present invention according to any one of the sixth to eighth aspects described above, and preferably a substance colored by means of the ink jet recording method of the present invention using the ink composition of the present invention.

The substance is preferably the following record-receiving materials.

In regard to the record-receiving material that can be colored, there are no particular limitations on the material. Examples include communication sheets such as paper and films; fabrics or clothes (cellulose, nylon, wool and the like), leather, and materials for color filters. Among these, communication sheets are preferred.

Preferred examples of the communication sheets include surface-treated sheets, more specifically, sheets provided with an ink-receiving layer on a base material such as a paper, a synthetic paper or a film. The ink-receiving layer is provided by, for example, a method of impregnating or coating the base material with a cationic polymer; or a method of coating an inorganic substance (usually, fine particles thereof) capable of absorbing the coloring matter in the ink, such as porous silica, an alumina sol or a special ceramic substance, together with a hydrophilic polymer such as polyvinyl alcohol or polyvinylpyrrolidone. Those sheets provided with such an ink-receiving layer are generally referred to as exclusive ink jet paper, exclusive ink jet film, glossy papers, glossy films, and the like.

Among the communication sheets described above, a sheet coated with porous white inorganic substances on the surface particularly has high surface glossiness, and also excellent water resistance, and thus is particularly suitable for recording of photographic image quality. However, it is known that recorded images on the sheet have increase of discoloration by ozone gas. However, the ink composition of the present invention is excellent in the ozone gas fastness, and thus also exerts great effects even when an ink jet is recorded on such record-receiving materials.

Representative examples of commercial products of the sheet coated with porous white inorganic substances on the surface described above include (trade name:) Photo Paper Glossy Pro (platinum grade), Photo Paper Gloss Gold manufactured by Canon, Inc.; Photo Paper Crispia® (high glossy), Photo Paper (glossy), and Photo Matte Paper manufactured by Seiko Epson Corp.; (trade name:) Advanced Photo Paper (glossy) manufactured by Hewlett-Packard Japan, Ltd.; and (trade name:) Kassai Photo Finish Pro manufactured by Fujifilm Corporation. However, the applications of the ink composition of the present invention are not limited to these exclusive paper and the like.

In addition to the exclusive paper described above, examples of the record-receiving materials include plain papers. The plain paper is those provided with the ink-receiving layer described above. Examples of the commercial products include plain papers exclusive for ink jet such as (trade name:) GF-500, Canon Plain Paper White manufactured by Canon, Inc.; and (trade name:) Two-side Fine Quality Plain Paper manufactured by Seiko Epson Corp. Furthermore, examples of those not exclusive for ink jet that may be used include PPC (Plain Paper Copy) paper and the like.

In recording with the ink jet recording method of the present invention on a record-receiving material such as a communication sheet, for example, a container containing the ink composition described above is loaded at a predetermined position of an ink jet printer, and recording may be performed on the record-receiving material with the ordinary recording method.

The ink jet recording method of the present invention can use, together with the ink composition of the present invention, for example, a known ink composition of respective colors such as a magenta ink, a cyan ink or a yellow ink, and if necessary, a green ink, a blue ink (or a violet ink) and a red ink (or an orange ink) in combination.

The ink compositions of respective colors are filled into their respective containers, and the respective containers are loaded onto a predetermined position of the ink jet printer, similarly to the container containing the ink composition of the present invention for use in the ink jet recording.

The respective compounds contained as the coloring matters (I), (II) and (III) in the ink composition of the present invention, are easily synthesized and cheap. Furthermore, the respective compounds have high solubility with respect to an aqueous medium, and also have excellent water solubility, and thus have satisfactory filterability through membrane filters in the process of preparing an ink composition.

The ink composition of the present invention or an ink prepared from the ink composition has excellent storage stability and discharge stability as well. Specifically, the ink composition of the present invention has no solid precipitation, no change of physical property, no change of the hue and the like after storage for a long time, and has satisfactory storage stability.

Furthermore, the ink composition of the present invention is suitably used for ink jet recording, for writing tools and the like. The ink composition of the present invention exhibits neutral black to gray color without color tone in any case of dark color printing and light color printing particularly when recorded on exclusive ink jet paper, and has less change of the hue even when recorded in a different medium. Furthermore, the ink composition of the present invention has very high print (printing) density of recorded images, and causes no bronzing on the images even when printed with a high density solution. In addition, the ink composition of the present invention is also excellent in various fastness properties such as moisture resistance and water resistance, particularly light fastness and ozone gas fastness.

Furthermore, the ink composition of the present invention is excellent in various fastness properties in combination with another ink composition containing coloring matters of magenta, cyan, and yellow, and allows full-color ink jet recording that is excellent in storability.

Further, the ink composition of the present invention can also be positively used in plain paper. As described above, the ink composition of the present invention is very useful as a black ink for ink jet recording.

EXAMPLES

Hereinafter, the present invention will be described more specifically by way of Examples, but the present invention is not intended to be limited by the following Examples.

The "parts" and "percent (%)" in the Examples are on a mass basis, unless particularly stated otherwise. Furthermore, the respective operations of the various synthesis reactions, crystallization and the like were all carried out under stirring. In the case where a desired amount of an intended compound is not obtained with one time of a synthesis reaction, the reaction was repeatedly carried out until the desired amount was obtained.

Furthermore, in the following respective formula, the functional groups such as a sulfo group and a carboxy group are described in the form of a free acid for convenience.

Furthermore, all of the pH values and the reaction temperatures described in Examples exhibit values measured in the reaction system.

Furthermore, the maximal absorption wavelengths (λmax) of the synthesized compounds were measured in an aqueous solution of pH 5 to 8, and the measured values were described in Examples for the measured compounds.

Furthermore, the compound of the following formula (26) was synthesized by the method described in Example 8 of PCT International Application, Publication No. 2005/097912.

parts of 50% sulfuric acid, and 4.7 parts of 40% nitrosylsulfuric acid was added dropwise thereto over about 10 minutes at 5° C. to 10° C. under stirring, and thereby a diazo suspension was obtained.

Meanwhile, to 30 parts of water, 2.9 parts of a compound represented by the formula (28) and 0.4 parts of sulfamic acid were added, and then the mixture was adjusted to pH 5.0 to 5.5 by adding sodium hydroxide to obtain an aqueous solution.

To the aqueous solution thus obtained, the diazo suspension described above was added dropwise at a reaction temperature of 20° C. to 30° C. for about 10 minutes.

After completion of the dropwise addition, the reaction system was stirred at the same temperature for 2 hours, and adjusted to pH 0.7 to 1.2 by adding sodium hydroxide, and then a solid precipitated therefrom was taken by filtration. Thus, 11.8 parts of the wet cake containing the compound represented by the following formula (29) was obtained.

Meanwhile, the compound of the following formula (28) was obtained by the method described in Japanese Unexamined Patent Application, Publication No. 2004-083492.

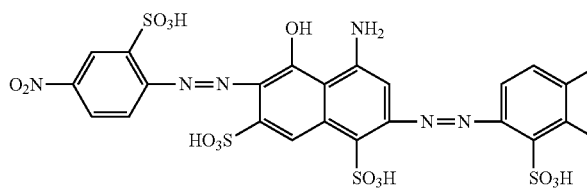
(26)

Synthesis Example 1

Step 1

5.0 Parts of 2-amino-6-methoxybenzothiazole was slowly added to 16 parts of 15% fuming sulfuric acid at 15° C. to 25° C. After the addition, the mixture was stirred for 2 hours at the same temperature. Subsequently, the mixture was added dropwise to 60 parts of ice water over about 10 minutes. The precipitated crystals were taken by filtration and dried. Thus, 6.4 parts of the compound represented by the following formula (27) was obtained.

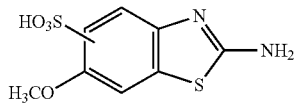
(27)

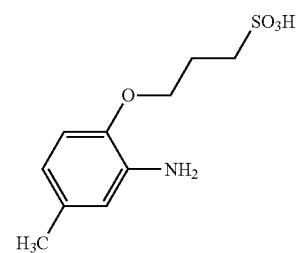
(28)

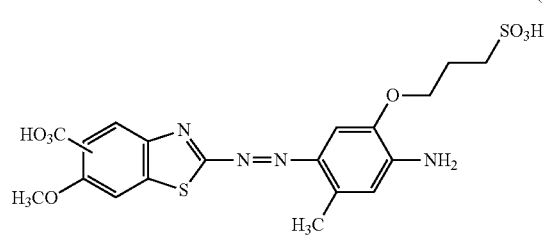
(29)

Step 3

To 30 parts of water, 2.7 parts of the compound represented by the following formula (30) was added, and then the mix- Step 2

3.2 Parts of the compound represented by the formula (27) obtained in the step (1) described above was suspended in 20 ture was adjusted to pH 7.5 to 8.0 by adding sodium hydroxide to obtain an aqueous solution.

Meanwhile, the wet cake containing the compound represented by the formula (29) obtained as described above (Step 2) was suspended in 110 parts of water under stirring, and the mixture was adjusted to pH 6.0 to 6.5 by adding sodium hydroxide to obtain an aqueous solution.

To the aqueous solution thus obtained, 2.6 parts of 35% hydrochloric acid, and then 2.0 parts of an aqueous solution of 40% sodium nitrite were added dropwise at a reaction temperature of 15° C. to 20° C. for about 5 minutes. Thus, a diazo suspension was obtained.

The diazo suspension thus obtained was added dropwise to an aqueous solution containing the compound represented by the formula (30) previously obtained, at a reaction temperature of 20° C. to 30° C. for 20 minutes. At this time, the reaction system was added with sodium carbonate so as to be maintained at 7.0 to 8.0 of the pH value.

After completion of the dropwise addition, the reaction system was stirred at the same temperature for 2 hours, and added with sodium chloride whereby to carry out salting-out. A solid precipitated therefrom was taken by filtration. Thus, 16.9 parts of the wet cake containing a compound represented by the following formula (31) was obtained.

hydrochloric acid to pH 0 to 0.5, and stirred at 5° C. to 10° C. for 2 hours. The precipitated crystals were taken by filtration, and thus 10.9 parts of a compound represented by the following formula (32) was obtained.

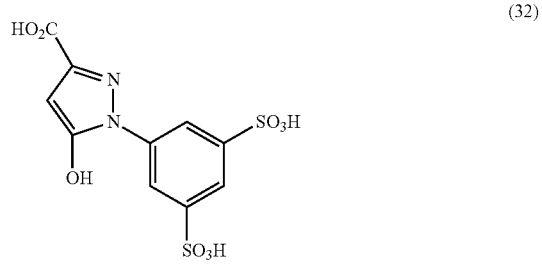

(32)

Step 5

To 30 parts of water, 2.5 parts of the compound represented by the formula (32) obtained as described above (Step 4) was added, and then the mixture was adjusted to pH 7.5 to 8.0 by adding sodium hydroxide to obtain an aqueous solution.

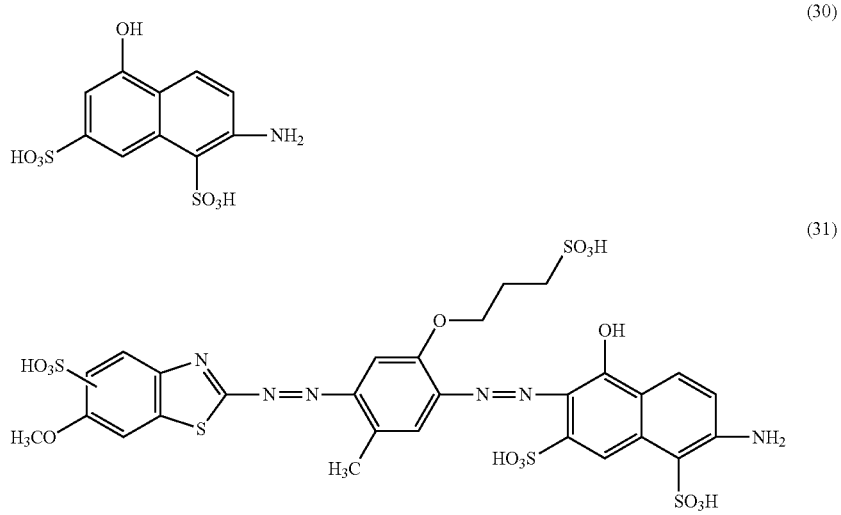

(30)

(31)

Step 4

To 30 parts of water, 12.7 parts of 3,5-disulfo aniline, 18.3 parts of 35% hydrochloric acid, and then 9.1 parts of an aqueous solution of 40% sodium nitrite at a reaction temperature of 0° C. to 5° C. were added dropwise for about 5 minutes.

Thus, a diazo liquid was obtained. Meanwhile, under stirring, to dimethyl acetyl succinate, 9 parts of water, and then 2 parts of ethanol were added and suspended, and then the diazo liquid previously obtained was added dropwise thereto at a reaction temperature of 10° C. to 20° C. for 15 minutes. After the dropwise addition, the reaction system was added with sodium acetate so as to be maintained at 7.0 to 8.0 of the pH value.

After completion of the dropwise addition, the reaction system was stirred at the same temperature for 2 hours, and added with sodium hydroxide to pH 13.0 to 13.5 and stirred at 15° C. to 20° C. for 2 hours, and then added with 35%

Meanwhile, the total amount of the wet cake containing the compound represented by the formula (31) obtained as described above (Step 3) was dissolved in 150 parts of water under stirring, 3.5 parts of 35% hydrochloric acid, and then 1.5 parts of an aqueous solution of 40% sodium nitrite at a reaction temperature of 20° C. to 25° C. were added dropwise for about 5 minutes. Thus, a diazo liquid was obtained.

The diazo liquid thus obtained was added dropwise to an aqueous solution containing the compound represented by the formula (32) previously obtained, at a reaction temperature of 20° C. to 30° C. for 30 minutes. During this time, the reaction system was added with sodium carbonate so as to be maintained at 7.0 to 8.0 of the pH value.

After completion of the dropwise addition, the reaction system was stirred at the same temperature for 2 hours, and added with sodium chloride whereby to carry out salting-out. A solid precipitated therefrom was taken by filtration. Thus, 40.8 parts of a wet cake was obtained. The wet cake thus obtained was dissolved in 180 parts of water, and added with 250 parts of methanol whereby to be crystallized. A solid precipitated therefrom was taken by filtration thereby obtaining a wet cake. In addition, the wet cake thus obtained was dissolved in 180 parts of water, added with 22 parts of lithium chloride and added with 200 parts of methanol whereby to be crystallized. A solid precipitated therefrom was taken by filtration thereby obtaining a wet cake. The wet cake thus obtained was dissolved again in 80 parts of water, and added with 200 parts of methanol whereby to be crystallized. A solid precipitated therefrom was taken by filtration and dried. Thus, 7.0 parts of the compound represented by the following formula (33) (λmax: 606.5 nm) was obtained as a lithium salt. Meanwhile, this compound is a mixture of the compound represented by No. 38 as described in Table 7 and the compound represented by No. 40 as described in Table 7.

Synthesis Example 2

The compound represented by the following formula (34) was obtained by using 19.2 parts of 2-aminonaphthalene-4,6,8-trisulfonic acid instead of 12.7 parts of 3,5-disulfo aniline as a raw material in the synthesis of the compound represented by the formula (32), and using this as a raw material, the Step 5 of Synthesis Example 1 was performed. Thus, a compound represented by the following formula (35) (λmax: 607.0 nm) was obtained. Meanwhile, this compound is a

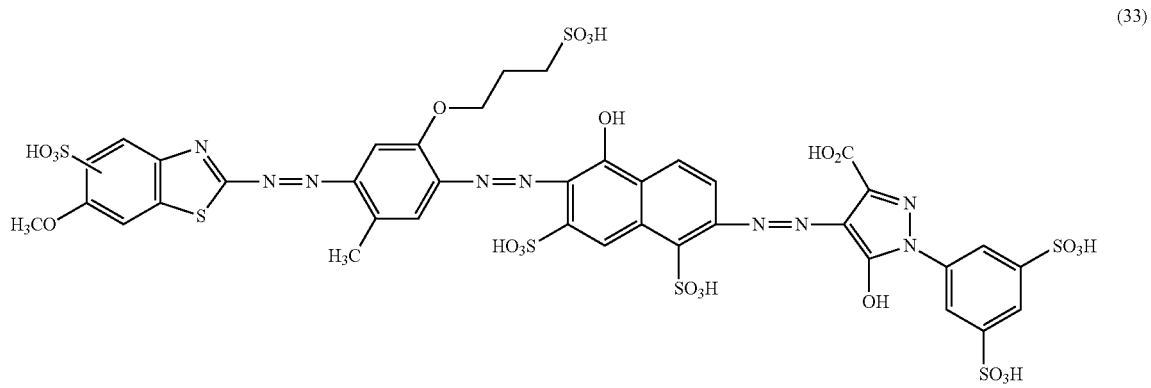

(33)

mixture of the compound represented by No. 32 as described in Table 5, and the compound represented by No. 33 as described in Table 6.

(34)

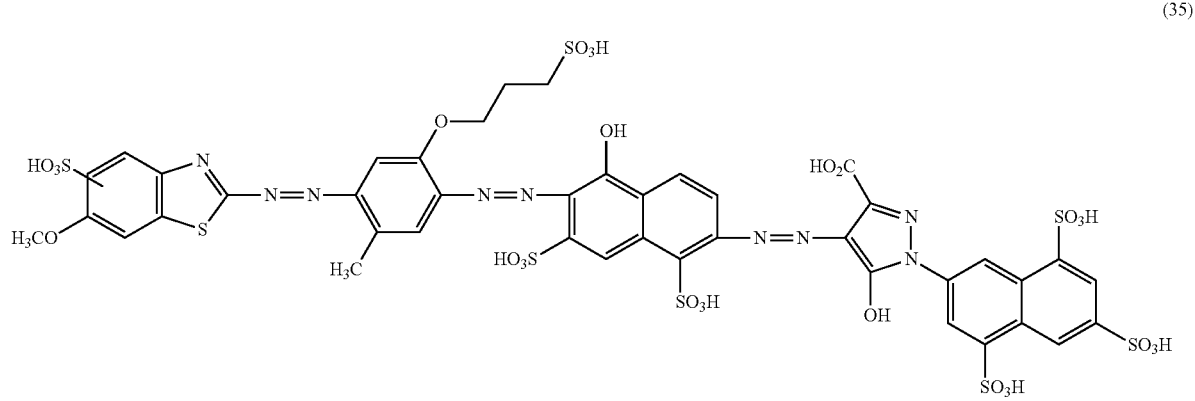

(35)

Synthesis Example 3

The compound represented by the following formula (36) (λmax: 604.0 nm) was synthesized by the method described in Examples 2 of Japanese Unexamined Patent Application, Publication No. 2009-84346. This compound is a mixture of the compound represented by No. 28 as described in Table 5 and the compound represented by No. 29 as described in Table 5.

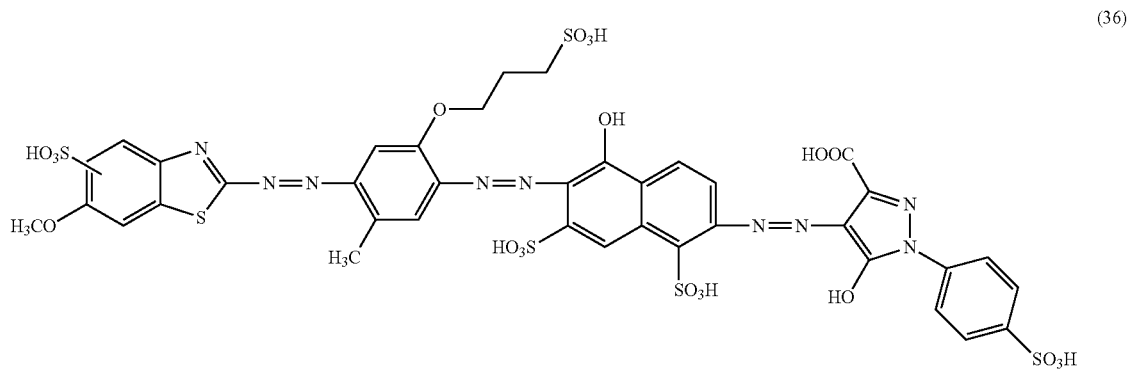

(36)

Synthesis Example 4

Step 1

35.7 parts of a monoazo compound represented by the following formula (37) (C.I. Acid Yellow 9) was added to 200 parts of water, and the monoazo compound was dissolved therein while the system was adjusted to pH 6 with sodium hydroxide. Subsequently, 7.2 parts of sodium nitrite was added thereto. This solution was added dropwise over 30 minutes to 300 parts of 5% hydrochloric acid maintained at 0° C. to 10° C., and then the mixture was stirred for one hour at or below 20° C. to perform a diazotization reaction. Thus, a diazo reaction liquid was prepared.

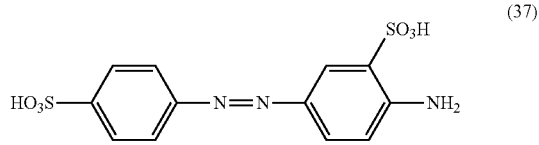 [SMILES: Nc1ccc(N=Nc2ccc(S(=O)(=O)O)cc2)cc1S(=O)(=O)O]

(37)

Meanwhile, 10.7 parts of 3-methylaniline, 10.4 parts of sodium hydrogen bisulfite, and 8.6 parts of a 35% aqueous formalin solution were added to 260 parts of water, and a methyl-ω-sulfonate derivative was obtained by a routine method.

The aqueous solution of the methyl-ω-sulfonate derivative thus obtained was added to the diazo reaction liquid previously prepared, and the mixture was allowed to react for 5 hours at 0° C. to 15° C., while the system was adjusted to pH 4 to 5 by adding sodium hydrogen carbonate 100 parts of 35% hydrochloric acid was added to the reaction liquid, and then the mixture was allowed to react further for 5 hours at 70° C. to 80° C. Sodium chloride was added to the reaction liquid for salting-out, and a solid precipitated therefrom was isolated by filtration. Thus, 120 parts of a compound represented by the following formula (38) was obtained as a wet cake.

(38)

Step 2

35.7 parts of the monoazo compound represented by the above formula (37) (C.I. Acid Yellow 9) was added to 200 parts of water, and was dissolved therein while the system was adjusted to pH 6 with sodium hydroxide. Subsequently, 7.2 parts of sodium nitrite was added thereto. This solution was added dropwise over 30 minutes to an aqueous solution prepared by diluting 31.3 parts of 35% hydrochloric acid with 200 parts of water, while maintaining the system at 0° C. to 10° C., and then the mixture was stirred for one hour at or below 20° C. to perform a diazotization reaction. 0.4 parts of sulfamic acid was added to the reaction liquid thus obtained, and the resulting mixture was stirred for 5 minutes. Thus, a diazo reaction liquid was prepared.

Meanwhile, 24.0 parts of a compound represented by the following formula (39) obtained by the method described in Japanese Unexamined Patent Application, Publication No. 2004-083492, and a 25% aqueous solution of sodium hydroxide were added to 300 parts of warm water at 40° C. to 50° C., and the mixture was adjusted to pH 5 to 6. Thus, an aqueous solution was obtained. To this aqueous solution, the diazo reaction liquid obtained as described above was added dropwise over 30 minutes at 15° C. to 25° C. During the dropwise addition, the system was maintained at pH 5 to 6 by adding an aqueous solution of sodium carbonate. After the dropwise addition, the mixture was stirred for 2 hours at the same temperature and at the same pH, and then the mixture was adjusted to pH 0 to 1 by adding 35% hydrochloric acid. The liquid thus obtained was heated to 65° C., and was stirred for 2 hours at the same temperature. Subsequently, the liquid was cooled to room temperature, and a solid precipitated therefrom was isolated by filtration. Thereby, 130 parts of a wet cake containing a compound represented by the following formula (40) was obtained.

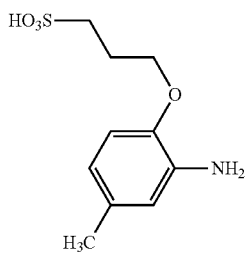

(39)

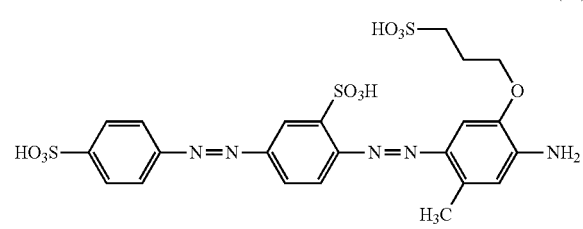

(40)

cyanuric chloride was added thereto at 5° C. to 10° C. After the addition, the mixture was stirred for 6 hours at 5° C. to 10° C. while the pH value was maintained at 6 to 7 by adding an aqueous solution of sodium carbonate.

Meanwhile, 51 parts of the wet cake containing the compound represented by formula (40) obtained in the (Step 2) was dissolved in 150 parts of water by adjusting the system to pH 7 to 8 by adding a 25% aqueous solution of sodium hydroxide. Thus, a solution was obtained. This solution was added to the reaction liquid described above, and then the resulting mixture was heated to 65° C. to 70° C. While the pH value was maintained at 6 to 7 by adding an aqueous solution of sodium carbonate, the mixture was stirred for 7 hours. Subsequently, 1.7 parts of piperazine was added thereto, and then the resulting mixture was heated to 90° C. to 95° C. While the pH value was maintained at 7 to 8 by adding an aqueous solution of sodium carbonate, the mixture was stirred for 18 hours.

The reaction liquid thus obtained was cooled to 20° C. to 30° C., and then salting-out was carried out by adding sodium chloride. A solid precipitated therefrom was isolated by filtration, and thus a wet cake was obtained.

This wet cake was dissolved in 600 parts of water. To this solution, 50 parts of methanol, and then 800 parts of 2-propanol were added, and the mixture was stirred for 30 minutes. A solid precipitated therefrom was isolated by filtration, and thereby a wet cake was obtained. The wet cake thus obtained was dissolved again in 400 parts of water, and 1000 parts of 2-propanol was added thereto. A solid precipitated therefrom was isolated by filtration and dried. Thereby, 25.3 parts of an azo compound represented by the following formula (41) ($\lambda$max: 435 nm) was obtained as a sodium salt.

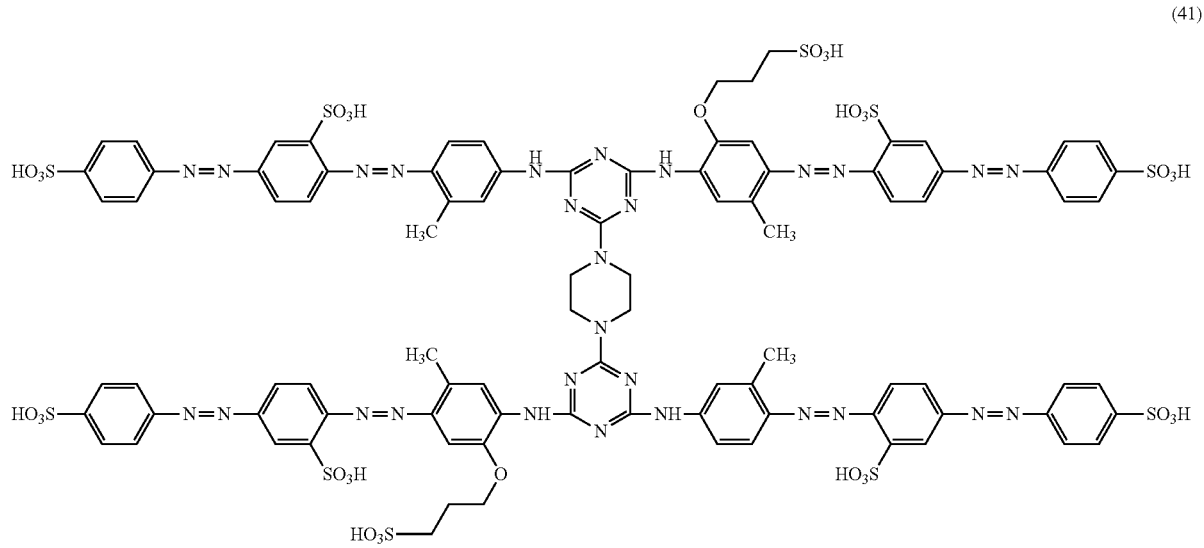 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O]

(41)

Step 3

50 parts of the wet cake containing the compound represented by formula (38) obtained in the (Step 1) was dissolved in 300 parts of water by adjusting the system to pH 8 to 9 by adding a 25% aqueous solution of sodium hydroxide. To this solution, 0.48 parts of (trade name:) Leocol® TD90 (surfactant, hereinafter simply referred to as "Leocol® TD90") manufactured by Lion Corp. was added, and then 7.3 parts of Synthesis Example 5

65 parts of the wet cake containing the compound represented by formula (40) obtained in the (Step 2) of Synthesis Example 4 was dissolved in 250 parts of water by adjusting the system to pH 7 to 8 by adding a 25% aqueous solution of sodium hydroxide. To this solution, Leocol® TD90 (0.10 parts) was added, and then 3.8 parts of cyanuric chloride was added thereto at 15° C. to 25° C. After the addition, while the pH value was maintained at 5 to 6 by adding an aqueous solution of sodium carbonate, the mixture was stirred for 2 hours at 15° C. to 25° C. Subsequently, this reaction liquid was heated to 60° C. to 65° C., and while the pH value was maintained at 6 to 7 by adding an aqueous solution of sodium carbonate, the reaction liquid was stirred for 5 hours.

Subsequently, 0.89 parts of piperazine was added thereto, and then the resulting mixture was heated to 90° C. to 95° C. While the pH value was maintained at 8 to 9 by adding an aqueous solution of sodium carbonate, the mixture was stirred for 16 hours.

The reaction liquid thus obtained was cooled to 20° C. to 30° C., and then salting-out was carried out by adding sodium chloride. A solid precipitated therefrom was isolated by filtration, and thus a wet cake was obtained. This wet cake was dissolved in 400 parts of water. To this solution, 50 parts of methanol, and then 800 parts of 2-propanol were added, and the resulting mixture was stirred for 30 minutes. A solid precipitated therefrom was isolated by filtration, and thereby, a wet cake was obtained. The wet cake thus obtained was dissolved again in 200 parts of water, and 800 parts of 2-propanol was added thereto. A solid precipitated therefrom was isolated by filtration and dried. Thus, 13.5 parts of an azo compound represented by the following formula (42) (λmax: 436 nm) was obtained as a sodium salt.

Examples described below. At the time of the preparation of ink, lithium hydroxide was used appropriately for the purpose of adjusting the pH of each ink to 8 to 10, and ion exchanged water was added to 100 parts of the total amount.

TABLE 11

| Ink composition | Example 1 | Example 2 | Example 3 | Example 4 | Comparative Example 1 |
|---|---|---|---|---|---|
| Coloring matter (I) | (26) 1.92 | (26) 1.92 | (26) 1.92 | (26) 1.92 | — |
| Coloring matter (II) | (33) 1.92 | (36) 1.92 | (36) 1.92 | (35) 1.92 | — |
| Coloring matter (III) | (42) 1.16 | (41) 1.16 | (42) 1.16 | (42) 1.16 | — |
| coloring matter | — | — | — | — | (43) 1.35 |
| coloring matter | — | — | — | — | (44) 1.3 |
| coloring matter | — | — | — | — | (45) 2.35 |
| GLY | 5 | 5 | 5 | 5 | 5 |
| Urea | 5 | 5 | 5 | 5 | 5 |
| NMP | 4 | 4 | 4 | 4 | 4 |
| IPA | 3 | 3 | 3 | 3 | 3 |

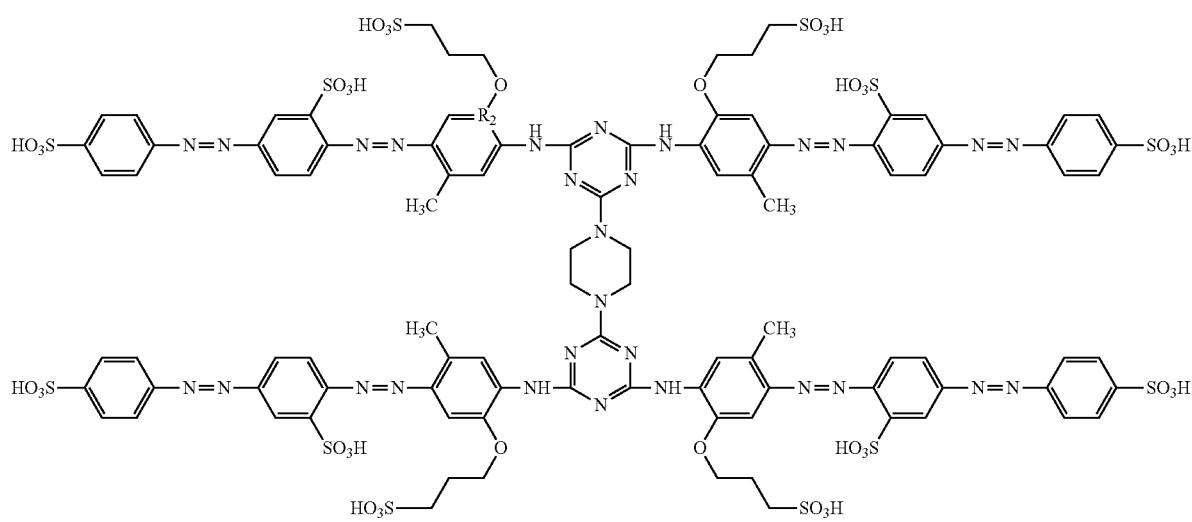

(42)

Examples 1 to 4 and Comparative Example 1

(A) Preparation of Ink

The respective components described in the following Table 11 were mixed. Thus, the ink compositions of the present invention and the ink compositions for comparison were obtained, respectively, and then contaminants were separated by filtration with a 0.45 μm membrane filter. Thus, an ink for a test was obtained. These preparations of the ink were taken as Examples 1 to 4, and Comparative Examples 1, respectively. The ink of the present invention thus obtained had no occurrence of precipitation or isolation during the storage, and had no occurrence of change in physical properties still after storage for a long time.

Furthermore, ion-exchanged water was used in the preparation of the inks in the respective Examples and Comparative TABLE 11-continued

| Ink composition | Example 1 | Example 2 | Example 3 | Example 4 | Comparative Example 1 |
|---|---|---|---|---|---|
| BCTL | 2 | 2 | 2 | 2 | 2 |
| EDTA | 0.1 | 0.1 | 0.1 | 0.1 | 0.1 |
| SURF | 0.1 | 0.1 | 0.1 | 0.1 | 0.1 |
| Water | 75.8 | 75.8 | 75.8 | 75.8 | 75.8 |
| Total | 100 | 100 | 100 | 100 | 100 |

Table 11 described above will be described.

The coloring matters (I), (II) and (III) in the table correspond to the coloring matters (I), (II) and (III) contained in the ink composition of the present invention, respectively. The fields of the respective coloring matters are divided into two up and down by the dotted lines. The numbers in the parentheses described in the upper field correspond to the numbers of the formulae of the compounds described in Examples. In the lower field, the numbers of the parts used are described. Further, any numbers described in the fields of the water-soluble organic solvent, respective additive and the like other than the field of the coloring matter, describe the numbers of the parts in the compositions.

Meanwhile, the abbreviations in the table represent the meanings described below.
GLY: Glycerin
NMP: N-methyl-2-pyrrolidone
IPA: Isopropanol
BCTL: Butyl carbitol
EDTA•2Na: Ethylenediamine tetraacetate disodium
SURF: (trade name:) Surfynol® manufactured by Nissin Chemical Industry CO., Ltd.

The coloring matters (43), (44), and (45) used in Comparative Examples are described in Table 11 described above.

These compounds were retested by the method disclosed in PCT International Application, Publication No. 2007/077931, whereby to obtain sodium salts of the compounds represented by the following formulae (43) to (45), respectively. The ink as described in Table 11 was prepared using these coloring matters. The ink thus obtained was taken as Comparative Example 1.

(B) Ink Jet Recording

Ink jet recording was carried out on a glossy paper, that is, (trade name:) "Photo Paper Advanced Photo Paper® (high glossy)" manufactured by Hewlett-Packard Japan, Ltd. using the respective inks obtained in respective Examples and respective Comparative Examples described above by means of an ink jet printer, (trade name:) "PIXUS® iP4500" manufactured by Canon, Inc. At the time of ink jet recording, image patterns were produced such that six grades of gradation at densities of 100%, 80%, 60%, 40%, 20% and 10% were obtained, and recorded materials of the gradation from dark black to light black were obtained. The recorded materials thus obtained were dried at room temperature for 24 hours or more after the printing, which were used for the various evaluations as the test specimens.

(C) Evaluation of Recorded Images

The respective test specimens obtained by the procedures described above were used for two kinds of ozone gas fastness tests.

Any of the colorimetric determinations of the recorded images in the evaluation was carried out using a colorimeter, (trade name:) "SpectroEye" manufactured by GRETAG-MACBETH. Any of the colorimetric determinations was car-

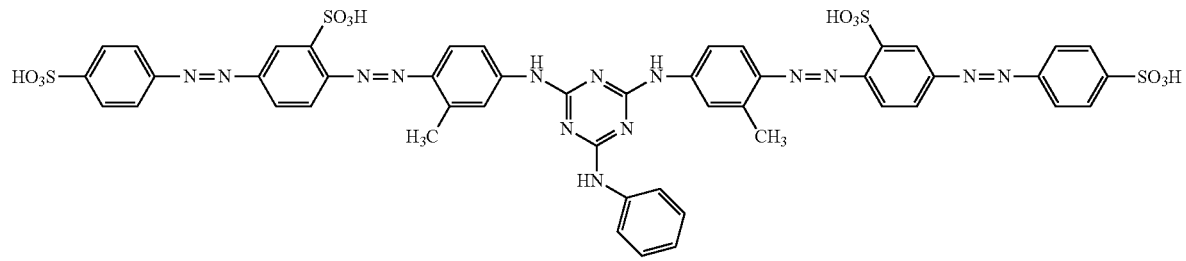

(43)

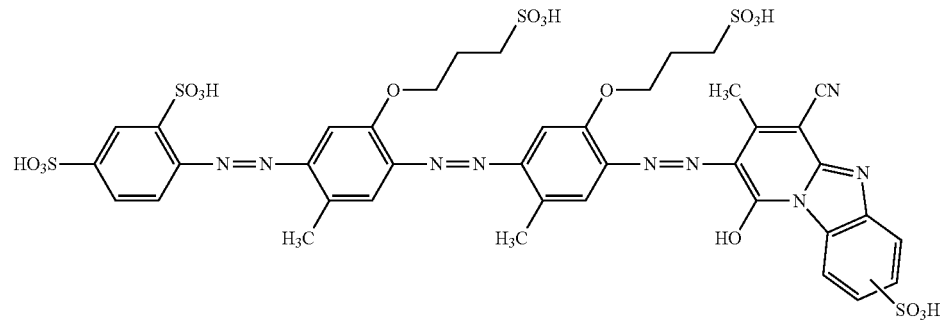

(44)

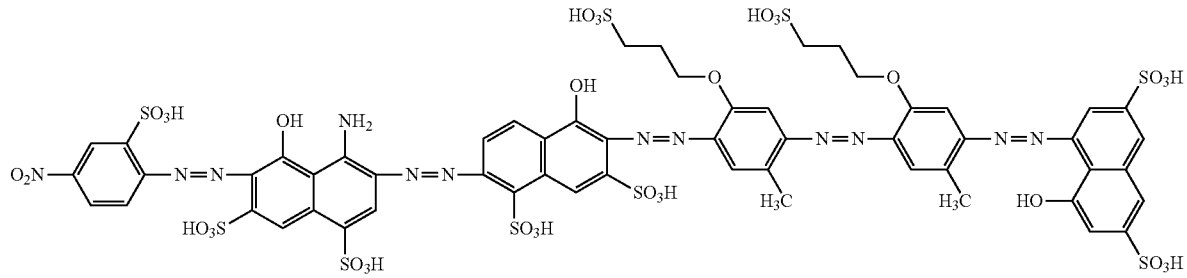

(45)

ried out under the conditions of a viewing angle of 2° and a light source of D65, using a density standard of DIN NB.

In the ozone gas fastness test, the ozone gas fastness was measured by means of colorimetric determinations of the gradation area having the Black reflection density Dk value of the recorded images in a range of 1.2 to 1.5 before the test. The test method is specifically described as follows.

1) Ozone Gas Fastness Test-1

A test specimen was installed on (trade name:) "Ozone Weather Meter" manufactured by Suga Test Instruments Co., Ltd., and allowed to stand for 24 hours under conditions of 10 ppm ozone concentration, 50% RH humidity and 23° C. temperature. In regard in the recorded images of the respective test specimens before and after exposure to ozone, $L^*$, $a^*$ and $b^*$ of CIE were measured, and the color difference $\Delta E$ was calculated by the following formula. Meanwhile, in the following calculation formula, $\Delta L^*$, $\Delta a^*$, and $\Delta b^*$ mean the respective differences of $L^*$, $a^*$, and $b^*$ before and after the exposures, respectively.

$$\Delta E = (\Delta L^{*2} + \Delta a^{*2} + \Delta b^{*2})^{1/2}$$

The test results were evaluated with the evaluation criteria described below. Less $\Delta E$ obtained before and after the ozone exposures represents less color change obtained before and after the test, and excellent results.

The evaluation results are presented in Table 12.

A: $\Delta E$ is less than 7.0.
B: $\Delta E$ is equal to or greater than 7.0 and less than 8.0.
C: $\Delta E$ is equal to or greater than 8.0 and less than 10.0.
D: $\Delta E$ is equal to or greater than 10.0.

TABLE 12

|  | Ozone gas fastness | |
| --- | --- | --- |
| Evaluation result | 1 | 2 |
| Example 1 | A | A |
| Example 2 | A | A |
| Example 3 | A | A |
| Example 4 | A | A |
| Comparative Example 1 | C | C |

As confirmed from the results of Table 12, the inks of the respective Examples exhibited very excellent results in all test items.

Specifically, it is confirmed that the inks of the respective Examples all have less color change with respect to the exposure to ozone gas, and produce printed images excellent in ozone gas fastness in comparison with the ink of Comparative Example 1.

The respective components described in the following Table 13 were mixed similarly to the "(A) preparation of ink" described above. Thus, the ink compositions of the present invention and for comparison were obtained, respectively, and then contaminants were separated by filtration with a 0.45 μm membrane filter. Thus, an ink for a test was obtained. These preparations of the inks were taken as Examples 1 to 4, and Comparative Examples 2 to 5, respectively. Meanwhile, the abbreviations in Table 13 represent the same as those in Table 11.

TABLE 13

|  | Example | | | | Comparative Example | | | |
| --- | --- | --- | --- | --- | --- | --- | --- | --- |
| Ink composition | 1 | 2 | 3 | 4 | 2 | 3 | 4 | 5 |
| Coloring matter (I) | (26) | (26) | (26) | (26) | (26) | — | — | (26) |
|  | 1.92 | 1.92 | 1.92 | 1.92 | 5.0 | — | — | 2.5 |
| Coloring matter (II) | (33) | (36) | (36) | (35) | — | (33) | (36) | (36) |
|  | 1.92 | 1.92 | 1.92 | 1.92 | — | 5.0 | 5.0 | 2.5 |
| Coloring matter (III) | (42) | (41) | (42) | (42) | — | — | — | — |
|  | 1.16 | 1.16 | 1.16 | 1.16 | — | — | — | — |
| GLY | 5 | 5 | 5 | 5 | 5 | 5 | 5 | 5 |
| Urea | 5 | 5 | 5 | 5 | 5 | 5 | 5 | 5 |
| NMP | 4 | 4 | 4 | 4 | 4 | 4 | 4 | 4 |
| IPA | 3 | 3 | 3 | 3 | 3 | 3 | 3 | 3 |
| BCTL | 2 | 2 | 2 | 2 | 2 | 2 | 2 | 2 |
| EDTA | 0.1 | 0.1 | 0.1 | 0.1 | 0.1 | 0.1 | 0.1 | 0.1 |
| SURF | 0.1 | 0.1 | 0.1 | 0.1 | 0.1 | 0.1 | 0.1 | 0.1 |
| Water | 75.8 | 75.8 | 75.8 | 75.8 | 75.8 | 75.8 | 75.8 | 75.8 |
| Total | 100 | 100 | 100 | 100 | 100 | 100 | 100 | 100 |

2) Ozone Gas Fastness Test-2

A test specimen was installed on (trade name:) "Ozone Weather Meter" manufactured by Suga Test Instruments Co., Ltd., and allowed to stand for 48 hours under conditions of 10 ppm ozone concentration, 50% RH humidity and 23° C. temperature. In regard in the recorded images of the respective test specimens before and after the ozone exposure, $L^*$, $a^*$ and $b^*$ of CIE were measured, and the color difference $\Delta E$ was calculated by the following formula. Meanwhile, in the following calculation formula, $\Delta L^*$, $\Delta a^*$, and $\Delta b^*$ mean the differences in the $L^*$, $a^*$, and $b^*$ obtained before and after exposures, respectively.

The evaluation results are presented in Table 12.

A: $\Delta E$ is less than 12.0.
B: $\Delta E$ is equal to or greater than 12.0 and less than 15.0.
C: $\Delta E$ is equal to or greater than 15.0 and less than 18.0.
D: $\Delta E$ is equal to or greater than 18.0.

Ink jet recording was carried out on a glossy paper, (trade name:) "Kassai Photo Finish Pro® <high glossy>" manufactured by FUJIFILM Corporation, similarly to the "(B) ink jet recording" described above using the respective inks obtained in respective Examples and Comparative Examples 2 to 4 by means of an ink jet printer, (trade name:) "PIXUS® iP4500" manufactured by Canon, Inc. At the time of ink jet recording, image patterns were produced such that 100% density gradation printed most heavily was obtained. Thus, black-recorded materials were obtained. The recorded materials thus obtained were dried at room temperature for 24 hours or more after the printing, which were used for various evaluation as test specimens.

The test for chroma was carried out similarly to the "(C) Evaluation of recorded images" described above using a colorimeter, (trade name:) "SpectroEye" manufactured by GRETAG-MACBETH. Any of the colorimetric determinations was carried out under the conditions of a viewing angle of 2° and a light source of D65, using a density standard of DIN NB.

4) Test for Chroma

In order to evaluate the quality of the black hue, the chroma C* value of the respective test specimens printed was evaluated. In the evaluation, L*, a* and b* of CIL were colorimetrically determined using the colorimetric determination system described above, and calculated using the following formula.

$$C^*(a^{*2}+b^{*2})^{1/2}$$

The test results were evaluated with the evaluation criteria described below. The evaluation results are presented in Table 14. The less the C* value (the closer to 0) is, the closer the color is to high quality black in achromatic color with no color tone, and thus the more excellent.

A: C* value is less than 5.
B: C* value is equal to or greater than 5 and less than 8.
C: C* value is equal to or greater than 8 and less than 10.
D: C* value is equal to or greater than 10.

TABLE 14

|  | Example | | | | Comparative Example | | | |
|---|---|---|---|---|---|---|---|---|
| Ink composition | 1 | 2 | 3 | 4 | 2 | 3 | 4 | 5 |
| Chroma value C* | A | A | A | A | D | D | D | D |

As confirmed from the results of Table 14, the inks of the respective Examples exhibited excellent results in comparison to the inks of the respective Comparative Examples.

Specifically, it is confirmed that an ink composed of either one of the coloring matter (I) or the coloring matter (II) as disclosed in Comparative Examples 2 to 4 and an ink composed of both of the coloring matter (I) and the coloring matter (II) as disclosed in Comparative Examples 5 do not produce neutral, achromatic black hue, and are inappropriate in the quality of black.

Meanwhile, it is confirmed that the inks of the respective Examples of the present invention containing the coloring matter (I), the coloring matter (II), and the coloring matter (III) all have the chroma thus obtained that is equal to or less than 5, and produces high quality of black hue recorded images in more achromatic color black.

From the results described above, it was revealed that any ink composition of the present invention containing 3 kinds of coloring matters of specific coloring matters (I) to (III) was very excellent in various fastness properties, particularly ozone gas fastness required for ink jet recorded images, and had sufficiently high print density, and produced neutral high quality, black recorded images with low chroma and no color tone when compared with a conventional black ink composition.

INDUSTRIAL APPLICABILITY

The ink composition of the present invention is suitable as a black ink liquid for ink jet recording, for various recordings such as writing tools, particularly for ink jet recording.

The invention claimed is:

1. An ink composition comprising at least one kind of a compound represented by the following formula (1) or a tautomer thereof or a salt thereof as a coloring matter (1):

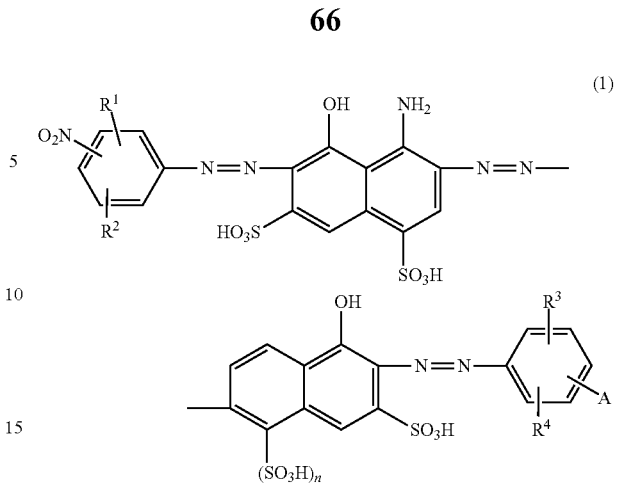

wherein,
R$^1$ and R$^2$ each independently represent a hydrogen atom; a halogen atom; a cyano group; a carboxy group; a sulfo group; a sulfamoyl group; an N-alkylaminosulfonyl group; an N,N-dialkylaminosulfonyl group; an N-phenylaminosulfonyl group; a phospho group; a nitro group; an acyl group; a ureido group; a C1-C4 alkyl group; a C1-C4 alkyl group substituted with a hydroxy group or a C1-C4 alkoxy group; a C1-C4 alkoxy group; a C1-C4 alkoxy group substituted with at least one kind of a group selected from the group consisting of a hydroxy group, a C1-C4 alkoxy group, a sulfo group, and a carboxy group; or an acylamino group;
R$^3$ and R$^4$ each independently represent a hydrogen atom; a halogen atom; a cyano group; a carboxy group; a sulfo group; a nitro group; a C1-C4 alkyl group; a C1-C4 alkoxy group; or a C1-C4 alkoxy group substituted with at least one kind of a group selected from the group consisting of a hydroxy group, a C1-C4 alkoxy group, a sulfo group, and a carboxy group;
n is 0 or 1; and
the group A is a group represented by the following formula (2):

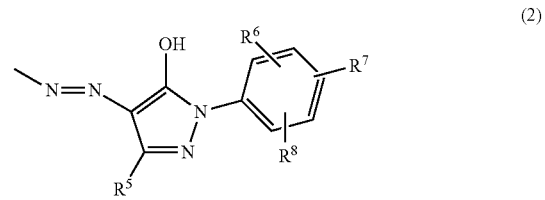

wherein,
R$^5$ represents a cyano group; a carboxy group; a C1-C4 alkyl group; a C1-C4 alkoxycarbonyl group; or a phenyl group; and
R$^6$, R$^7$ and R$^8$ each independently represent a hydrogen atom; a halogen atom; a cyano group; a carboxy group; a sulfo group; a nitro group; a C1-C4 alkyl group; a C1-C4 alkoxy group; a C1-C4 alkoxy group substituted with at least one kind of a group selected from the group consisting of a hydroxy group, a C1-C4 alkoxy group, and a sulfo group; or an acylamino group,
at least one kind of a compound represented by the following formula (3) or a tautomer thereof or a salt thereof as a coloring matter (II):

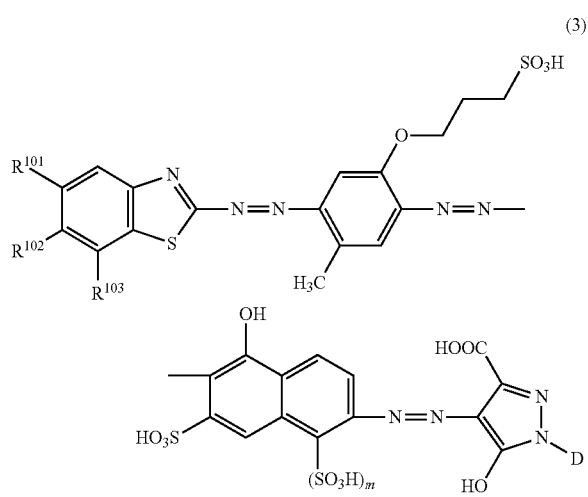

(3)

wherein,
m is 0 or 1;
R$^{101}$ to R$^{103}$ each independently represent a hydrogen atom; a sulfo group; or a C1-C4 alkoxy group; and
the group D represents a phenyl group or a naphthyl group substituted with one to three sulfo groups,
and
at least one kind of a compound represented by the following formula (4) or a salt thereof as a coloring matter (III):

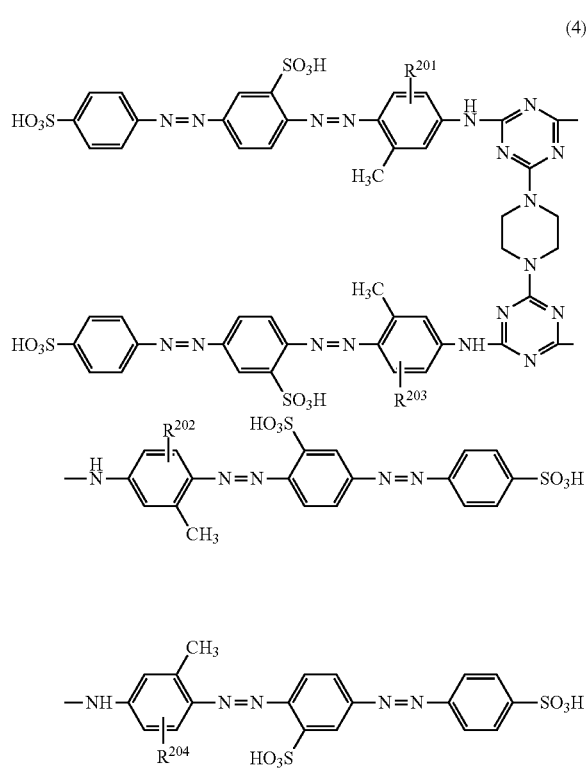

(4)

wherein,
R$^{201}$ to R$^{204}$ each independently represent a hydrogen atom; or a C1-C4 alkoxy group substituted with a sulfo group.

2. The ink composition according to claim 1, wherein, in the formula (1),
the substitution position of the nitro group is the 4-position when the substitution position of the azo group on the benzene ring to which the nitro group is substituted, is designated as the 1-position,
the substitution position of the group A is the 4-position when the substitution position of the azo group on the benzene ring to which the group A is substituted, is designated as the 1-position,
n is 1,
R$^1$, R$^3$ and R$^7$ are a sulfo group,
R$^2$ is a hydrogen atom,
R$^4$ is a hydrogen atom, a chlorine atom, or a sulfo group, and
R$^5$ is a carboxy group.

3. The ink composition according to claim 1, wherein, in the formula (3),
m is 1,
R$^{101}$ is a hydrogen atom or a sulfo group,
R$^{102}$ is a C1-C4 alkoxy group,
R$^{103}$ is a hydrogen atom or a sulfo group, and
the group D is one of a phenyl group substituted with one or two sulfo groups, and a naphthyl group substituted with three sulfo groups.

4. The ink composition according to claim 1, wherein, in the formula (4),
at least one of R$^{201}$ and R$^{202}$ is a sulfopropoxy group, and
at least one of R$^{203}$ and R$^{204}$ is a sulfopropoxy group.

5. The ink composition according to claim 1, wherein the ratio of the coloring matter (I) is 10 to 80% by mass, the ratio of the coloring matter (II) is 10 to 80% by mass, and the ratio of the coloring matter (III) is 10 to 40% by mass in the total mass of the coloring matters contained in the ink composition.

6. An ink jet recording method comprising performing recording by utilizing the ink composition according to claim 1 as an ink, discharging droplets of the ink in accordance with a recording signal, and thereby attaching the droplets onto a record-receiving material.

7. The ink jet recording method according to claim 6, wherein the record-receiving material is a communication sheet.

8. The ink jet recording method according to claim 7, wherein the communication sheet is a sheet comprising an ink-receiving layer containing a porous white inorganic substance.

9. A colored body colored by means of with the ink composition according to claim 1.

10. An ink jet printer loaded with a container containing an ink composition according to claim 1.

11. A colored body colored with the ink jet recording method according to claim 6.

* * * * *